United States Patent
Talla et al.

(10) Patent No.: US 10,652,073 B2
(45) Date of Patent: May 12, 2020

(54) BACKSCATTER DEVICES AND SYSTEMS PROVIDING BACKSCATTERED SIGNALS INCLUDING OFDM PACKETS

(71) Applicant: University of Washington, Seattle, WA (US)

(72) Inventors: Vamsi Talla, Seattle, WA (US); Joshua R. Smith, Seattle, WA (US); Shyamnath Gollakota, Seattle, WA (US); Bryce Kellogg, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 16/091,085

(22) PCT Filed: Apr. 4, 2017

(86) PCT No.: PCT/US2017/025966
§ 371 (c)(1),
(2) Date: Oct. 3, 2018

(87) PCT Pub. No.: WO2017/176772
PCT Pub. Date: Oct. 12, 2017

(65) Prior Publication Data
US 2019/0158341 A1 May 23, 2019

Related U.S. Application Data

(60) Provisional application No. 62/317,845, filed on Apr. 4, 2016.

(51) Int. Cl.
*H04L 5/12* (2006.01)
*H04L 27/36* (2006.01)
(Continued)

(52) U.S. Cl.
CPC ........ *H04L 27/365* (2013.01); *H04L 25/0278* (2013.01); *H04L 27/0002* (2013.01);
(Continued)

(58) Field of Classification Search
CPC    H04L 27/365; H04L 25/0278; H04L 27/0002
(Continued)

(56) References Cited

U.S. PATENT DOCUMENTS

| 4,298,280 A | 11/1981 | Harney |
|---|---|---|
| 4,916,460 A | 4/1990 | Powell |

(Continued)

FOREIGN PATENT DOCUMENTS

| EP | 2976734 | 1/2016 |
|---|---|---|
| WO | 2014153516 A1 | 9/2014 |

(Continued)

OTHER PUBLICATIONS

US 10,187,177 B2, 01/2019, Gollakota et al. (withdrawn)
(Continued)

*Primary Examiner* — Helene E Tayong
(74) *Attorney, Agent, or Firm* — Dorsey & Whitney LLP

(57) ABSTRACT

Examples described herein include backscatter devices which may transmit orthogonal frequency division multiplexing (OFDM) signals. Techniques for complex analog backscatter are described. Examples of impedance circuitry are described which may be used to provide real and imaginary components of impedance in accordance with inphase and quadrature bits.

20 Claims, 7 Drawing Sheets

(51) Int. Cl.
  *H04L 25/02* (2006.01)
  *H04L 27/00* (2006.01)
  *H04L 27/26* (2006.01)
  *H04L 27/34* (2006.01)
  *H04L 5/00* (2006.01)

(52) U.S. Cl.
  CPC ............ *H04L 27/26* (2013.01); *H04L 5/0007* (2013.01); *H04L 5/0023* (2013.01); *H04L 27/2626* (2013.01); *H04L 27/34* (2013.01)

(58) Field of Classification Search
  USPC ........................................................ 375/261
  See application file for complete search history.

(56) References Cited

U.S. PATENT DOCUMENTS

| | | |
|---|---|---|
| 5,164,985 A | 11/1992 | Nysen et al. |
| 5,220,330 A | 6/1993 | Salvail et al. |
| 5,321,599 A | 6/1994 | Tanamachi et al. |
| 5,649,296 A | 7/1997 | Maclellan et al. |
| 5,663,710 A | 9/1997 | Fasig et al. |
| 5,995,040 A | 11/1999 | Issler et al. |
| 6,084,530 A | 7/2000 | Pidwerbetsky et al. |
| 6,094,450 A | 7/2000 | Shockey |
| 6,107,910 A | 8/2000 | Nysen |
| 6,243,012 B1 | 6/2001 | Shober et al. |
| 6,259,408 B1 | 7/2001 | Brady et al. |
| 6,297,696 B1 | 10/2001 | Abdollahian et al. |
| 6,611,224 B1 | 8/2003 | Nysen et al. |
| 6,745,008 B1 | 6/2004 | Carrender et al. |
| 6,765,476 B2 | 7/2004 | Steele et al. |
| 6,838,989 B1 | 1/2005 | Mays et al. |
| 6,870,460 B2 | 3/2005 | Turner et al. |
| 6,970,089 B2 | 11/2005 | Carrender |
| 7,180,402 B2 | 2/2007 | Carrender et al. |
| 7,215,976 B2 | 5/2007 | Brideglall |
| 7,358,848 B2 | 4/2008 | Mohamadi |
| 7,469,013 B1 | 12/2008 | Bolt et al. |
| 7,535,360 B2 * | 5/2009 | Barink ................ G06K 7/0008 340/10.1 |
| 7,796,016 B2 * | 9/2010 | Fukuda ................ G01S 13/758 340/10.1 |
| 7,839,283 B2 | 11/2010 | Mohamadi et al. |
| 7,961,093 B2 | 6/2011 | Chiao et al. |
| 7,995,685 B2 | 8/2011 | Wang et al. |
| 8,026,839 B2 | 9/2011 | Weber |
| 8,120,465 B2 | 2/2012 | Drucker |
| 8,170,485 B2 | 5/2012 | Hulvey |
| 8,284,032 B2 | 10/2012 | Lee et al. |
| 8,391,824 B2 | 3/2013 | Kawaguchi |
| 8,526,349 B2 | 9/2013 | Fisher |
| 8,797,146 B2 | 8/2014 | Cook et al. |
| 8,952,789 B2 | 2/2015 | Dardari |
| 8,971,704 B2 | 3/2015 | Cavaliere et al. |
| 9,312,950 B1 | 4/2016 | Deyle |
| 9,357,341 B2 | 5/2016 | Deyle |
| 9,680,520 B2 | 6/2017 | Gollakota et al. |
| 9,973,367 B2 | 5/2018 | Gollakota et al. |
| 10,033,424 B2 | 7/2018 | Gollakota et al. |
| 10,079,616 B2 | 9/2018 | Reynolds et al. |
| 10,270,639 B2 | 4/2019 | Gollakota et al. |
| 2002/0015436 A1 | 2/2002 | Ovard et al. |
| 2003/0043949 A1 | 3/2003 | O'Toole et al. |
| 2003/0133495 A1 | 7/2003 | Lerner et al. |
| 2003/0174672 A1 | 9/2003 | Herrmann |
| 2004/0005863 A1 | 1/2004 | Carrender |
| 2004/0210611 A1 | 10/2004 | Gradishar et al. |
| 2005/0053024 A1 | 3/2005 | Friedrich |
| 2005/0099269 A1 | 5/2005 | Diorio et al. |
| 2005/0201450 A1 | 9/2005 | Volpi et al. |
| 2005/0248438 A1 * | 11/2005 | Hughes ............... G06K 19/0717 340/10.4 |
| 2005/0253688 A1 | 11/2005 | Fukuda |
| 2005/0265300 A1 | 12/2005 | Rensburg |
| 2006/0044147 A1 | 3/2006 | Knox et al. |
| 2006/0045219 A1 * | 3/2006 | Wang ................... G06K 7/0008 375/346 |
| 2006/0082458 A1 | 4/2006 | Shanks et al. |
| 2006/0087406 A1 | 4/2006 | Willins et al. |
| 2006/0109127 A1 | 5/2006 | Barink et al. |
| 2006/0220794 A1 | 10/2006 | Zhu |
| 2006/0236203 A1 | 10/2006 | Diorio et al. |
| 2006/0261952 A1 | 11/2006 | Kavounas et al. |
| 2007/0018904 A1 | 1/2007 | Smith |
| 2007/0046434 A1 | 3/2007 | Chakraborty |
| 2007/0069864 A1 | 3/2007 | Bae et al. |
| 2007/0096876 A1 | 5/2007 | Bridgelall et al. |
| 2007/0109121 A1 | 5/2007 | Cohen |
| 2007/0111676 A1 | 5/2007 | Trachewsky et al. |
| 2007/0115950 A1 | 5/2007 | Karaoguz et al. |
| 2007/0201786 A1 | 8/2007 | Wuilpart |
| 2007/0210923 A1 | 9/2007 | Butler et al. |
| 2007/0285245 A1 | 12/2007 | Djuric et al. |
| 2007/0293163 A1 | 12/2007 | Kilpatrick |
| 2008/0131133 A1 | 6/2008 | Blunt et al. |
| 2008/0136646 A1 | 6/2008 | Friedrich |
| 2008/0165007 A1 | 7/2008 | Drago et al. |
| 2008/0180253 A1 | 7/2008 | Ovard et al. |
| 2008/0207357 A1 | 8/2008 | Savarese et al. |
| 2008/0211636 A1 | 9/2008 | O'Toole et al. |
| 2008/0225932 A1 | 9/2008 | Fukuda |
| 2008/0252442 A1 | 10/2008 | Mohamadi et al. |
| 2009/0201134 A1 * | 8/2009 | Rofougaran ........ G06K 19/0723 340/10.1 |
| 2009/0243804 A1 | 10/2009 | Fukuda |
| 2010/0156651 A1 | 6/2010 | Broer |
| 2010/0271188 A1 | 10/2010 | Nysen |
| 2011/0053178 A1 | 3/2011 | Yang |
| 2011/0069777 A1 | 3/2011 | Hurwitz et al. |
| 2011/0080267 A1 | 4/2011 | Clare et al. |
| 2012/0001732 A1 | 1/2012 | Kawaguchi |
| 2012/0002766 A1 | 1/2012 | Kawaguchi |
| 2012/0051411 A1 | 3/2012 | Duron et al. |
| 2012/0112885 A1 | 5/2012 | Drucker |
| 2012/0245444 A1 | 9/2012 | Otis et al. |
| 2012/0311072 A1 | 12/2012 | Huang et al. |
| 2012/0313698 A1 | 12/2012 | Ochoa et al. |
| 2013/0028305 A1 | 1/2013 | Gollakota et al. |
| 2013/0028598 A1 | 1/2013 | Cavaliere et al. |
| 2013/0069767 A1 | 3/2013 | Ovard et al. |
| 2013/0176115 A1 | 7/2013 | Puleston et al. |
| 2013/0215979 A1 | 8/2013 | Yakovlev et al. |
| 2013/0223270 A1 | 8/2013 | Cheng |
| 2013/0265140 A1 | 10/2013 | Gudan et al. |
| 2013/0286959 A1 | 10/2013 | Lou et al. |
| 2013/0322498 A1 | 12/2013 | Maguire |
| 2014/0016719 A1 | 1/2014 | Manku |
| 2014/0044233 A1 | 2/2014 | Morton |
| 2014/0113561 A1 | 4/2014 | Maguire |
| 2014/0313071 A1 * | 10/2014 | McCorkle ................ G01S 7/28 342/202 |
| 2014/0364733 A1 | 12/2014 | Huang et al. |
| 2015/0108210 A1 | 4/2015 | Zhou |
| 2015/0168535 A1 | 6/2015 | Httner et al. |
| 2015/0311944 A1 | 10/2015 | Gollakota et al. |
| 2015/0381269 A1 | 12/2015 | Deyle |
| 2016/0094933 A1 | 3/2016 | Deyle |
| 2016/0266245 A1 * | 9/2016 | Bharadia ................ G01S 7/038 |
| 2016/0365890 A1 | 12/2016 | Reynolds et al. |
| 2017/0180075 A1 | 6/2017 | Gollakota et al. |
| 2017/0180178 A1 | 6/2017 | Gollakota et al. |
| 2017/0180703 A1 | 6/2017 | Kovacovsky et al. |
| 2017/0331509 A1 | 11/2017 | Gollakota et al. |
| 2018/0024224 A1 | 1/2018 | Seller |
| 2018/0331865 A1 | 11/2018 | Ziv et al. |
| 2018/0358996 A1 | 12/2018 | Gollakota et al. |
| 2018/0375703 A1 | 12/2018 | Kellogg et al. |
| 2019/0116078 A1 | 4/2019 | Gollakota et al. |

FOREIGN PATENT DOCUMENTS

| | | |
|---|---|---|
| WO | 2015123306 A1 | 8/2015 |
| WO | 2015123341 A1 | 8/2015 |

(56) References Cited

FOREIGN PATENT DOCUMENTS

| WO | 2016100887 A2 | 6/2016 |
|---|---|---|
| WO | 2017027847 A1 | 2/2017 |
| WO | 2017132400 A1 | 8/2017 |
| WO | 2017176772 A1 | 10/2017 |
| WO | 2018075653 A1 | 4/2018 |
| WO | 2018187737 A1 | 10/2018 |

OTHER PUBLICATIONS

US 10,187,241 B2, 01/2019, Gollakota et al. (withdrawn)
Cadence, "Cadence Spectre RF Option", http://www.cadence.com/products/rf/spectre_rf_simulation/pages/default.aspx. (Retrieved Jul. 19, 2018).
Digipoints. DigiPoints Series vol. 1 Leader Guide Module 9—Network Architectures. Sep. 18, 2015, pp. 9.i-9.18.
IEEE, "IEEE Standard for Ethernet", http://standards.ieee.org/getieee802/download/802.11-2012.pdf., Dec. 28, 2012.
International Search Report and Written Opinion dated Aug. 22, 2017 for PCT application No. PCT/US2017/025966.
Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf. (Retrieved Jul. 19, 2018).
NASA, "A Wi-Fi Reflector Chip To Speed Up Wearables", http://www.jpl.nasa.gov/news/news.php?feature=4663. Jul. 22, 2015.
PCT Application No. PCT/US2018/026545 titled 'Image and/or Video Transmission Using Backscatter Devices' filed on Apr. 6, 2018, all pages.
Qualcomm, "AR9462 Single-chip, 2.4/5GHz, 2-stream 802.11a/b/g/n and BT 4.0+HS SoC Solution with SST Technology", http://www.qca.qualcomm.com/wp-content/uploads/2013/11/AR9462.pdf. (Retrieved Jul. 19, 2018).
Qualcomm, "QCA4002/4004 Qualcomm low-power Wi-Fi", http://www.eeworld.com/cn/zt/wireless/downloads/QCA4002-4004FIN.pdf. (Retrieved Jul. 19, 2018).
Synopsys, "Concurrent Timing, Area, Power and Test Optimization", http://www.synopsys.com/Tools/Implementation/RTLSynthesis/DesignCompiler/Pages/default.aspx. (Retrieved Jul. 19, 2018).
U.S. Appl. No. 15/752,214 entitled 'Backscatter Devices and Network Systems Incorporating Backscatter Devices' filed Feb. 12, 2018, pp. all.
U.S. Appl. No. 16/072,858, titled "Backscatter Devices Including Examples of Single Sideband Operations", filed Jul. 25, 2018, all pages.
Unknown, "Altera de1 fpga development board", http://www.terasic.com.tw/cgi-bin/page/archive.pl?No=83.(Retrieved Jul. 19, 2018).
Unknown, "Analog DevicesHMC190BMS8/190BMS8E", https://www.hittite.com/content/documents/data_sheet/hmc190bms8.pdf, (Retrieved Jul. 19, 2018).
Unknown, "Nest Cam Indoor", https://nest.com/camera/meet-nest-cam/?dropcam=true. 2018. (Retrieved Jul. 19, 2018).
U.S. Appl. No. 15/958,880 titled 'Apparatuses, Systems, and Methods for Communicating Using MIMO and Spread Spectrum Coding in Backscatter of Ambient Signals' filed Apr. 20, 2018, all pgs.
"Advanced Television Systems Committee (ATSC) (Sep. 1995) "ATSC Digital Television Standard," ATSC Doc. A/53, 74 pages", Sep. 1995.
"Analog Devices (retrieved Apr. 2016) "ADG919 RF Switch Datasheet," available online at: http://www.datasheet-pdf.com/PDF/ADG919-Datasheet-AnalogDevices-140819", Apr. 2016.
"Analog Devices, Inc. (retrieved Jan. 2016) "ADG9.02 RF switch datasheet," available online at: http://www.analog.com/static/imported-files/data_sheet/adg901_902.pdf", Jan. 2016.
"Axcera.com (retrieved Jan. 2016) "8VSB vs. COFDM," available online at: http://www.axcera.com/downloads/technotes-whitepapers/technote_4.pdf", Jan. 2016.
"DiBEG (May 2014; retrieved Jan. 2016) "The Launching Country," available online at: http://www.dibeg.org/world/world.html", May 2014.

"E. Inc. (retrieved Apr. 2016) "Universal software radio peripheral," available online at: http://ettus.com", Apr. 2016.
"Encounternet (retrieved Jan. 2016) "The Encounternet Project," available online at: http://encounternet.net/", Jan. 2016.
"Federal Communications Commission (retrieved Jan. 2016) "41 dBu service contours around ASRN 1226015, FCC TV query database," available online at: http://transition.fcc.gov/fcc-bin/tvq?list=0&facid=69571", Jan. 2016.
Invitation to Pay Additional Fees dated Jun. 19, 2017 for PCT Application No. PCT/US2017/025966, pp. 2.
"STMicroelectronics (Jul. 20102) "TS 881 Datasheet," 1 page", Jul. 2012.
Anthony,, Sebastian , ""Free energy harvesting from TV signals to power a ubiquitous internet of things"", ExtremeTech, google search, Jul. 8, 2013, 8 pages, Jul. 8, 2013.
Bharadia, et al., "Backfi: High Throughput WiFi Backscatter". In Proceedings of the 2015 ACM Conference on Special Interest Group on Data Communication, Aug. 2015.
Bharadia, et al., ""Full duplex backscatter"", Proceedings of the 12th ACM Workshop on Hot Topics in Networks, Article No. 4, pp. 1-7, Nov. 2013.
Bharadia, et al., ""Full duplex radios"", Proceedings of the ACM SIGCOMM 2013 (SIGCOMM '13), pp. 375-386, Aug. 2013.
Bohorquez, et al., ""A 350 µW CMOS MSK transmitter and 400 µW OOK super-regenerative receiver for medical implant communications"", IEEE Journal of Solid-State Circuits, 44(4):1248-1259, Apr. 2009.
Buettner, , ""Backscatter Protocols and Energy-Efficient Computing for RF-Powered Devices"", PhD Thesis, University of Washington, Seattle, WA, 144 pages, Retrieved Jan. 2016., 2012.
Buettner, et al., ""Dewdrop: Air energy-aware runtime for computational RFID"", Proceedings of the 8th USENIX Conference on Networked Systems Design and Implementation (NSDI'11), pp. 197-210, Mar. 2011.
Buettner, et al., ""RFID Sensor Networks with the Intel WISP"", Proceedings of the 8th ACM Conference on Embedded Network Sensor Systems (SenSys '08), pp. 393-394, Nov. 2008.
Chen, et al., Denis Guangyin Chen et al, "Pulse-Modulation Imaging—Review and Performance Analysis", IEEE Transactions on Biomedical Circuits and Systems, vol. 5, No. 1, Feb. 2011, at 64.
Chokshi, et al., "Yes! Wi-Fi and Bluetooth Can Coexist in Handheld Devices", Emerging and Embedded Business Unit, Marvell Semiconductor, Inc., Mar. 2010.
Dayhoff, , ""New Policies for Part 15 Devices"", Federal Communications Commission (FCC) Telecommunications Certification Body Council (TCBC) Workshop 2005, 13 pages, May 2005.
Dementyev, et al., ""Wirelessiy Powered Bistable Display Tags"", ACM International Joint Conference on Pervasive and Ubiquitous Computing (UbiComp '13), pp. 383-386, Sep. 2013.
Dementyev, A. et al., ""A Wearable UHF RFID-Based EEG System"", 2013 IEEE International Conference on RFID (RFID), pp. 1-7, Apr.-May 2013.
Duarte, et al., "Full-duplex wireless communications using off-the-shelf radios: Feasibility and first results", 2010 Conference Record of the 44th Asilomar Conference on Signals, Systems and Comupters (ASILOMAR), pp. 1558-1562, Nov. 2010.
Duarte, "Full-duplex Wireless: Design, Implementation and Characterization", Ph.D. thesis, Rice University, 70 pages, Apr. 2012.
Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, Retrieved Jan. 2016, 2006 copyright.
Elliott, , ""Average U.S. Home Now Receives a Record 118.6 TV Channels, According to Nielsen"", avaitable online at: http://www.nielsen.com/us/en/insights/pressroom/2008/average_u_s_home.html, Jun. 2008.
Ensworth, et al., "Every smart phone is a backscatter reader: Modulated backscatter compatibility with bluetooth 4.0 low energy (ble) devices", 2015 IEEE International Conference, on RFID. (Retrieved Jul. 19, 2018).
Gorlatova, et al., "Energy harvesting active networked tags (EnHANTs) for ubiquitous object networking", IEEE Wireless Communications, 17(6):18-25, Dec. 2010.

(56) References Cited

OTHER PUBLICATIONS

Greene, et al., "Intel's Tiny Wi-Fi Chip Could Have a Big Impact". MIT Technology review, Sep. 21, 2012.
Guo, et al., ""Virtual full-duplex wireless communication via rapid on-off-division duplex"", 48th Annual Allerton Conference on Communication, Control, and Computing (Allerton), pp. 412-419, Sep.-Oct. 2010.
Jain, et al., ""Practical, real-time, full duplex wireless"", Proceedings of the 17th Annual International Conference on Mobile Computing and Networking (MobiCom'11), pp. 301-312, Sep. 2011.
Javed, et al., Sajid Javed et al, Background Subtraction Via Superpixel-Based Online Matrix Decomposition With Structured Foreground Constraints, ICCVW '15 Proceedings of the 2015 IEEE International Conference on Computer Vision Workshop, Dec. 2015.
Johnston, Scott , "Software Defined Radio Hardware Survey", Oct. 2011, 31 pgs.
Kellogg, et al., "Bringing gesture recognition to all devices", Proceedings of the 11th USENIX Conference on Network Systems Design and Implementation (NSDI'14), pp. 303-316, Apr. 2014.
Kellogg, et al., "Wi-Fi Backscatter Internet Connectivity for RF-Powered Devices", University of Washington, SIGCOMM'14, Aug. 17-22, 2014.
Khannur, et al., "A Universal UHF RFID reader IC in 0.18-μm CMOS Technology". Solid-State Circuits, IEEE Journal of, 4(5):1146-1155, May 2008.
Kim, et al., "Flush: a reliable bulk transport protocol for multihop wireless networks", Proceedings of the 5th International Conference on Embedded Networked Sensor Systems (SenSys '07), pp. 351-365, Nov. 2007.
Kleinrock, et al., ""Packet Switching in Radio Channels: Part I—Carrier Sense Multiple-Access Modes and Their Throughput-Delay Characteristics"", IEEE Transactions on Communications; 23(12):1400-1416, Dec. 1975.
Kodialam, et al., ""Fast and reliable estimation schemes in RFID systems"", Proceedings of the 12th Annual International Conference on Mobile Computing and Networking (MobiCom '06), pp. 322-333, Sep. 2006.
Koomey, JG et al., ""Implications of Historical Trends in the Electrical Efficiency of Computing"", IEEE Annals of the History of Computing, 33(3):46-54, Aug. 2011.
Kuester, et al., "Baseband Signals and Power in Load-Modulated Digital Backscatter," IEEE Antenna and Wireless Propagation Letter, vol. II, 2012, pp. 1374-1377, Nov. 2012.
Lazarus, "Remote, wireless, ambulatory monitoring of implantable pacemakers, cardioverter defibrillators, and cardiac resynchronization therapy systems. analysis of a worldwide database", Pacing and Clinical Electrophysiology, 30(Suppl 1):S2-S12, Jan. 2007.
Liang, et al., ""Surviving wi-fi interference in low power zigbee networks"", Proceedings of the 8th ACM Conference on Embedded Networked Sensor Systems (SenSys '10), pp. 309-322, Nov. 2010.
Liu, et al., "Ambient Backscatter: Wireless Communication out of Thin Air", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.
Liu, et al., ""Digital Correlation Demodulator Design for RFID Reader Receiver"", IEEE Wireless Communications and Networking Conference (WCNC 2007), pp. 1666-1670, Mar. 2007.
Liu, et al., ""Enabling Instantaneous Feedback with Full-duplex Backscatter"", Proceedings of the 20th Annual International Conference on Mobile Computing and Networking (MobiCom'14), pp. 67-78, Sep. 2014.
Lu, et al., "Enfold: Downclocking OFDM in WiFi". In Proceedings of the 20th annual international conference on Mobile computing and networking, pp. 129-140. ACM, Sep. 2014.
Lu, et al., "Slomo: Downctocking WiFi Communication". In NSDI, pp. 255-258, Apr. 2013.
Mace, , ""Wave reflection and transmission in beams"", Journal of Sound and Vibration, 97(2):267-246, Nov. 1984.
Manweiler, et al., "Avoiding the Rush Hours: Wifi Energy Management via Traffic Isolation", In MobiSys, Jul. 2011.
Mastrototaro, , ""The MiniMed Continuous Glucose Monitoring System"", Diabetes Technology & Therapeutics, 2(Suppl 1):13-18, Dec. 2000.
Merritt, , "Atheros targets cellphone with Wi-Fi chip", EE Times (Nov. 2, 2009), http://www.eetimes.com/document.asp?doc_id=1172134.
Metcalfe, et al., ""Ethenet: Distributed packet switching for local computer networks"", Communications of the ACM, 19(7):395-404, Jul. 1976.
Mishra, et al., ""Supporting continuous mobility through multi-rate wireless packetization"", Proceedings of the 9th Workshop on Mobile Computing Systems and Applications (HotMobile '08), pp. 33-37, Feb. 2008.
Mittal, et al., "Empowering developers to estimate app energy consumption". In MobiCom, Aug. 2012.
Murray Associates, , "The Great Seal Bug Part 1", Murray Associates, Mar. 2017.
Mutti, et al., ""CDMA-based RFID Systems in Dense Scenarios: Concepts and Challenges"", 2008 IEEE International Conference on RFID, pp, 215-222, Apr. 2008.
Naderiparizi, et al., Saman Naderiparizi etal, "Ultra-Low-Power Wireless Streaming Cameras", arXiv:1707.08718v1, Jul. 27, 2017, Cornell University Library.
Navaneethan, et al., Navaneethan. VM. Security Enhancement of Frequency Hopping Spread Spectra Based on Oqpsk Technique, IOSR Journal of Electronics and Communication Engineering, May 2016, 62.
Nikitin, et al., ""Passive tag-to-tag communication"", 2012 IEEE International Conference on RFID (RFID), pp. 177-184, Apr. 2012.
Nikitin, et al., ""Theory and measurement of backscattering from RFID tags"", IEEE Antennas and Propagation Magazine, 48(6):212-218, Dec. 2006.
Obeid, et al., ""Evaluation of spike-detection algorithms for a brain-machine interface application"", IEEE Transactions on Biomedical Engineering, 51(6):905-911, Jun. 2004.
Occhiuzzi, et al., ""Modeling, Design and Experimentation of Wearable RFID Sensor Tag"", IEEE Transactions on Antennas and Propagation, 58(8):2490-2498, Aug. 2010.
Pandey, et al., ""A Sub-100 μW MICS/ISM Band Transmitter Based on Injection-Locking and Frequency Multiplication"", IEEE Journal of Solid-State Circuits, 46(5):1049-1058, May 2011.
Parks, et al., ""A wireless platform utilizing ambient RF energy"", 2013 IEEE Topical Conference on Biomedical Wireless Technologies, Networks, and Sensing Systems (BioWireleSS), pp. 154-158, Jan. 2013.
Parks, Aaron N. et al., "Turbocharging Ambient Backscatter Communication", SIGCOMM, Aug. 2014, 1-12.
Pillai, et al., ""An Ultra-Low-Power Long Range Battery/Passive RFID Tag for UHF and Microwave Bands With a Current Comsumption of 700 nA at 1.5 V"", IEEE Transactions on Circuits and Systems I: Regular Papers, 54(7):1500-1512, Jul. 2007.
Proakis, et al., "Digital Communications". 2005. McGraw-Hill, New York (Retrieved Jul. 19, 2018).
Qing, et al., ""A folded dipole antenna for RFID"", IEEE Antennas and Propagation Society International Symposium, 1:97-100, Jun. 2004.
Rabaey, et al., ""PicoRadios for wireless sensor networks: the next challenge in ultra-low power design"", 2002 IEEE International Solid-State Circuits Conference, Digest of Technical Papers (ISSCC), 1:200-201, Feb. 2002.
Ransford, et al., ""Mementos: system support for long-running computation on RFID-scale devices"", ACM SIGPLAN Notices—Proceedings of the 16th International Conference on Architecturla Support for Programming Languages and Operating Systems (ASPLOS '11), 46(3):159-170, Mar. 2011.
Rao, KVS et al., ""Antenna design for UHF RFID tags: a review and a practical application"", IEEE Transactions on Antennas and Propagation, 53(12)13870-3876, Dec. 2005.
Rattner, et al., "Connecting the Future: It's a Wireless World", Sep. 2013.

(56) References Cited

OTHER PUBLICATIONS

Roy, et al., ""RFID: From Supply Chains to Sensor Nets"", Proceedings of the IEEE, 98(9)1583-1592, Jul. 2010.
Sample, et al., ""Design of an RFID-Based Battery-Free Programmable and Sensing Platform"", IEEE Transactions on Instrumentation and Measurement, 57(11)2608-2815, Nov. 2008.
Sample, et al., ""Experimental results with two wireless power transfer systems"", IEEE Radio and Wireless Symposium (RAWCON), pp. 16-18, Jan. 2009.
Seigneuret, et al., ""Auto-tuning in passive UHF RFID tags"", 2010 8th IEEE International NEWCAS Conference (NEWCAS), pp. 181-184, Jun. 2010.
Sen, et al., ""CSMA/CN: Carrier sense multiple access with collision notification"", Proceedings of the 16th Annual International Conference on Mobile Computing and Networking (MobiCom'10), pp. 25-36, Sep. 2010.
Smith, Jr et al., ""A wirelessly-powered platform for sensing and computation"", ACM International Joint Conference on Pervasive and Ubiquitous Computing (UbiComp 2006), 4206:495-506, Sep. 2006.
So, et al., ""Multi-channel mac for ad hoc networks; handling multi-channel hidden terminals using a single transceiver"", Proceedings of 5th ACM International Symposium on Mobile Ad Hoc Networking and Computing, pp. 222-233, May 2004.
Srinivasan, et al., ""An empirical study of low-power "", ACM Transactions on Sensor Networks (TOSN), vol. 6, Issue 2, Article No. 16, Feb. 2010.
Thomas, et al., ""A 98 Mbit/sec, 15,5 pJ/bit 16-QAM modulator for UHF backscatter communication"", 2012 IEEE International Conference on RFID (RFID), IEEE RFID Virtual Journal, pp. 186-190 Apr. 2012.
Tubaishat, et al., ""Sensor networks: an overview"", IEEE Potentials, 22(2):20-23, Apr.-May 2003.
Walden, , ""Analog-to-digital converter survey and analysis"", IEEE Journal on Selected Areas in Communications, 17(4):539-550, Apr. 1999.
Welbourne, et al., ""Building the Internet of Things Using RFID: The RFID Ecosystem Experience"", IEEE Internet Computing, 13(3)48-55, May-Jun. 2009.
Wuu, et al., ""Zero-Collision RFID Tags Identification Based on CDMA"", 5th International Conference on Information Assurance and Security (IAS '09), pp. 513-518, Aug. 2009.
Yi, et al., ""Analysis and Design Strategy of UHF Micro-Power CMOS Rectifiers for Micro-Sensor and RFID Applications"", IEEE Transactions on Circuits and Systems I: Regular Papers, 54(1):153-166, Jan. 2007.
Ying, et al., "A System Design for UHF RFID Reader", In Communication Technology, 2008. ICCT 2008. 11th IEEE International Conference on pp. 301-304, IEEE, Nov. 2008.
Zalesky, et al., ""Integrating segmented electronic paper displays into consumer electronic devices"", 2011 IEEE International Conference on Consumer Electronics (ICCE), pp. 531-532, Jan. 2011.
Zhang, et al., ""Frame retransmissions considered harmful: improving spectrum efficiency using micro-ACKs"", Proceedings of the 18th Annual International Conference on Mobile Computing and Networking (MobiCom '12), pp. 89-100, Aug. 2012.
Zhang, et al., "EkhoNet: High Speed Ultra Low-power Backscatter for Next Generation Sensors", School of Computer Science, University of Massachusetts, Amherst, MA 01003, Sep. 2014.
Analog devices—rf/if circuits, http://www.analog.com/library/analogDialogue/archives/43-09/EDCh%204%20rf%20if.pdf.
U.S. Appl. No. 16/343,088 titled "Backscatter Systems, Devices, and Techniques Utilizing CSS Modulation and/or Higher Order Harmonic Cancellation" filed Apr. 18, 2019.
Andrews, et al., A Passive Mixer-First Receiver With Digitally Controlled and Widely Tunable RF Interface, IEEE Journal of Solid-State Circuits, vol. 45, No. 12, Dec. 2010, p. 2696-2708.
Kellogg, et al., Passive WI-FI: Bringing Low Power to WI-FI Transmissions, Proceedings of the 13th USENIX Symposium on Networked Systems Design and Implementation, Mar. 2016, 15 pages.
Marki, et al., Mixer Basics Primer: A Tutorial for RF & Microwave Mixers, Marki Microwave, Inc., 2010, 12 pages.
Talla, et al., Hybrid Analog-Digital Backscatter: A New Approach for Battery-Free Sensing, IEEE International Conference on RFID, May 2013, 8 pages.
Extended European Search Report for Application No. 17779671.1, dated Nov. 20, 2019.

* cited by examiner

BACKSCATTER DEVICES AND SYSTEMS PROVIDING BACKSCATTERED SIGNALS INCLUDING OFDM PACKETS

CROSS-REFERENCE TO RELATED APPLICATION(S)

This application is a 35 U.S.C. § 371 National Stage Application of PCT Application No. PCT/US2017/025966, filed Apr. 4, 2017, which claims the benefit under 35 U.S.C. § 119 of the earlier filing date of U.S. Provisional Application Ser. No. 62/317,845 filed Apr. 4, 2016, the entire contents of which are hereby incorporated by reference, in their entirety, for any purposes.

STATEMENT REGARDING RESEARCH & DEVELOPMENT

This invention was made with government support under CNS-1407583 and CNS-1452494 awarded by the National Science Foundation. The government has certain rights in the invention.

TECHNICAL FIELD

Examples described herein relate generally to backscatter systems and devices. Examples of backscatter devices that may provide backscatter signals including OFDM packets are described.

BACKGROUND

OFDM signals are increasingly popular in wireless communication standards. However, the power required for such communication may be prohibitive to fully implementing a variety of Internet of Things ("IoT"), or other ubiquitous sensing scenarios. While CMOS technology scaling has conventionally provided exponential benefits for the size and power consumption of digital logic systems, analog RF components, that are necessary for communication of OFDM signals, have not seen a similar power scaling. As a result, it may be prohibitive to transmit OFDM signals from sensors and mobile devices.

SUMMARY

Examples of backscatter devices are described herein. An example backscatter device may include an antenna, baseband circuitry configured to provide inphase bits and quadrature bits corresponding to data for transmission, first circuitry coupled to the antenna and the baseband circuitry and configured to provide a real component of antenna impedance corresponding to the inphase bits, and second circuitry coupled to the antenna and the baseband circuitry and configured to provide an imaginary component of the antenna impedance corresponding to the quadrature bits.

In some examples, the baseband circuitry includes a first combiner configured to upconvert by combining at least some of the data with a first subcarrier square wave and a second combiner configured to upconvert at least some of the data with a second subcarrier square wave having a 90 degree phase shift from the first subcarrier square wave.

In some examples, the first circuitry comprises a transistor coupled to the antenna and wherein the transistor includes a gate configured to receive a voltage based on an analog conversion of the inphase bits.

In some examples, the first circuitry comprises a plurality of binary weighted transistors connected in parallel, and the plurality of binary weighted transistors are each configured to receive a respective one of the inphase bits at their gate.

In some examples, the first circuitry comprises a plurality of transistors, each configured to couple a respective one of a plurality of resistors to the antenna based on a respective gate voltage, and the plurality of transistors are each configured to receive a respective one of the inphase bits at their gate.

In some examples, the second circuitry comprises a transistor coupled to the antenna and a varactor coupled between the antenna and a reference voltage, and the transistor includes a gate configured to receive a voltage based on an analog conversion of the quadrature bits.

In some examples, the second circuitry comprises a transistor coupled to the antenna and a capacitor coupled between the antenna and a reference voltage, and the transistor includes a gate configured to receive a voltage based on an analog conversion of the quadrature bits.

In some examples, the second circuitry comprises a plurality of transistors, each configured to couple a respective one of a plurality of capacitors to the antenna based on a respective gate voltage, and the plurality of transistors are each configured to receive a respective one of the quadrature bits at their gate.

In some examples, the plurality of capacitors comprise a plurality of binary weighted capacitors.

Examples of systems are described herein. An example system may include a helper device configured to transmit a carrier signal, and a backscatter device. The backscatter device may include an antenna positioned such that the carrier signal is incident on the antenna, baseband circuitry configured to provide inphase bits and quadrature bits based on data for transmission, and impedance circuitry configured to provide a real component of antenna impedance corresponding to the inphase bits and a complex component of the antenna impedance corresponding to the quadrature bits, such that the backscatter device is configured to backscatter the carrier signal to form a backscatter signal including orthogonal frequency division multiplexing (OFDM) packets.

In some examples, the baseband circuitry includes an analog to digital converter configured to convert the inphase and quadrature bits to converted analog inphase and quadrature bits, and the impedance circuitry is further configured to receive the converted analog inphase and quadrature bits as input.

In some examples, the impedance circuitry comprises a transistor coupled to the antenna, the transistor configured to receive the converted analog inphase bits at a gate of the transistor.

In some examples, the impedance circuitry comprises an inductor coupled to the antenna and a varactor coupled between the antenna and a reference voltage, and the inductor is configured to receive the converted analog quadrature bits.

In some examples, the transistor comprises a first transistor and the impedance circuitry further comprises a second transistor coupled to the antenna and a capacitor coupled between the second transistor and a reference voltage, and the second transistor is configured to receive the converted quadrature bits at a gate of the second transistor.

In some examples, the baseband circuitry is configured to provide the inphase and quadrature bits as digital bits to the impedance circuitry.

In some examples, the impedance circuitry comprises a first plurality of transistors coupled to the antenna and a plurality of capacitors, each coupled between a respective one of the first plurality of transistors and a reference voltage, the first plurality of transistors configured to receive the quadrature bits at respective gates of the first plurality of transistors and couple selected ones of the plurality of capacitors to the antenna based on the quadrature bits.

In some examples, the impedance circuitry comprises a second plurality of transistors coupled to the antenna and a plurality of resistors, each coupled between a respective one of the second plurality of transistors and the reference voltage, the second plurality of transistors configured to receive the inphase bits at respective gates of the second plurality of transistors and couple selected ones of the plurality of resistors to the antenna based on the inphase bits.

In some examples, the impedance circuitry comprises a second plurality of transistors coupled to the antenna, each coupled between the antenna and the reference voltage, the second plurality of transistors configured to receive the inphase bits at respective gates of the second plurality of transistors and provide an amount of resistance using the second plurality of transistors based on the inphase bits.

Examples of methods are described herein. An example method may include generating data for transmission at a backscatter device, performing baseband operations on the data to generate inphase and quadrature bits corresponding to the data, and modulating an impedance of an antenna to backscatter an incident carrier signal in accordance with the inphase and quadrature bits to provide a backscattered signal including OFDM packets corresponding to the data.

In some examples, said generating data comprises sensing data from an environment proximate the backscatter device.

In some examples, said modulating the impedance comprises coupling an amount of resistance to the antenna based on the inphase bits.

In some examples, said modulating the impedance comprises coupling an amount of capacitance to the antenna based on the quadrature bits.

Some examples may further include converting the inphase and quadrature bits to converted analog inphase and quadrature bits, and wherein said modulating comprises modulating the impedance in accordance with the converted analog inphase and quadrature bits.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Examples described herein include backscatter devices which may transmit orthogonal frequency division multiplexing (OFDM) signals. Accordingly, low-power OFDM transmitters are described. Techniques are described which may allow for backscatter of an arbitrary waveform at orders of magnitude lower power than active radios. For example, OFDM packets may be transmitted which may allow for backscatter devices to communicate in accordance IEEE 802.11 b/g/n/ac/ah Wi-Fi standards and/or 4G LTE in some examples.

While CMOS technology scaling has conventionally provided exponential benefits for the size and power consumption of digital logic systems, analog radio frequency (RF) components that may be used for radio communication have not typically seen a similar power scaling. As a result, radio transmitters and receivers on sensors and mobile devices still may consume hundreds of milliwatts of power. To reduce this power requirement, examples described herein decouple the digital baseband from the power-consuming RF components. We delegate the power consuming RF functionalities and RF components to one or more helper devices in the network and backscatter devices described herein may perform only baseband functions. Accordingly, orders of magnitude reduction in the power consumption of both transmitters and receivers may be achieved in some examples. Examples described herein include Wi-Fi OFDM transmitters. However, techniques described herein may be used in a range of protocols including ones which use OFDM, such as the LTE standard.

Examples described herein may provide for synthesis of OFDM packets using backscatter communication. Generally, OFDM packets may be considered as two orthogonal analog signals which may be generated in digital baseband at low power in some examples. Techniques described herein may be used to backscatter complex I/Q analog values corresponding to OFDM packets and these OFDM packets may be decoded on standard 802.11 compliant Wi-Fi radios.

Figure 1:
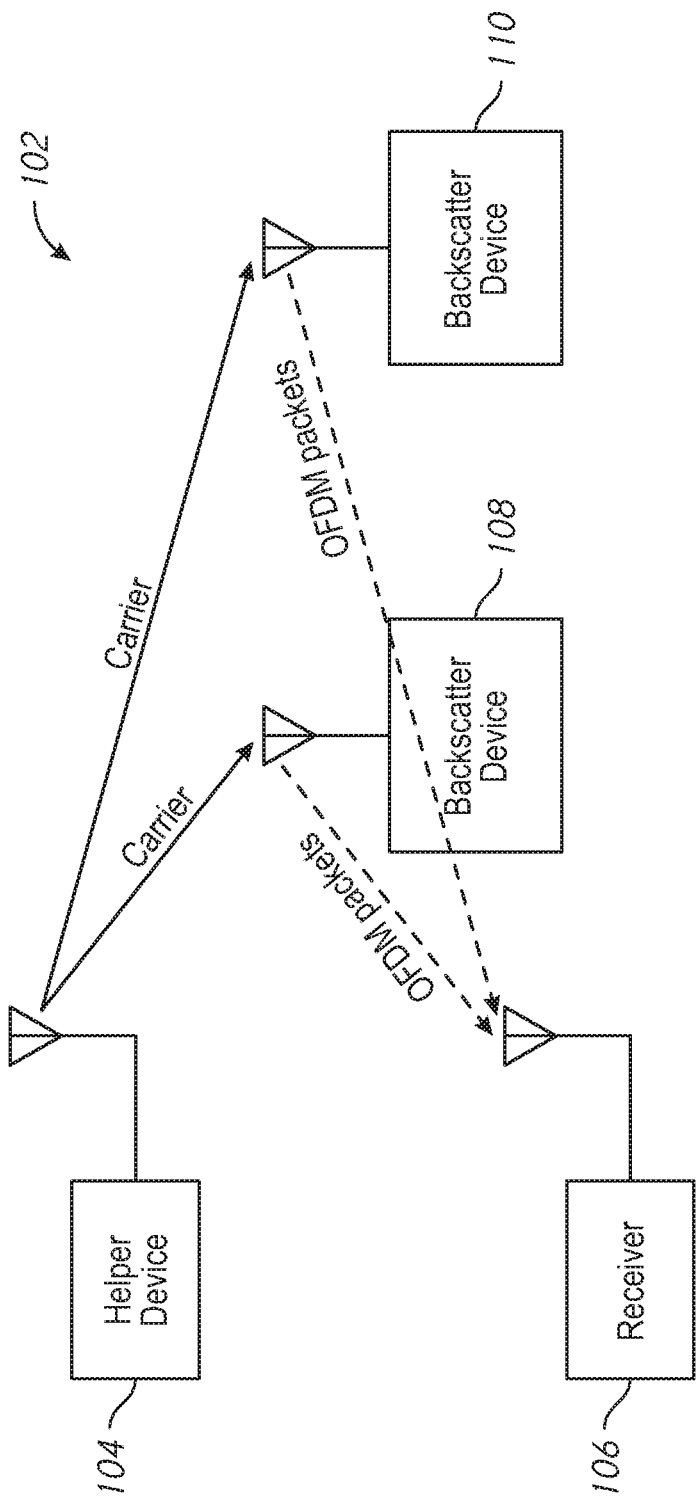
FIG. 1 is a schematic illustration of a system arranged in accordance with examples described herein.

FIG. 1 is a schematic illustration of a system arranged in accordance with examples described herein. The system 102 includes helper device 104, receiver 106, backscatter device 108, and backscatter device 110. During operation, the helper device 104 transmits a carrier signal. The backscatter device 108 and/or backscatter device 110 may backscatter the carrier signal into transmissions that may be compliant with a wireless communication protocol, such as an orthogonal frequency division multiplexing (OFDM) signal. The transmissions from the backscatter device 108 and/or backscatter device 110 may be received by the receiver 106. In this manner, the receiver 106 may be any electronic device that is capable of receiving a wireless communication signal (e.g. a wireless communication device) arranged in the protocol transmitted by the backscatter device 108 and/or backscatter device 110, e.g. OFDM. Accordingly, backscatter devices may transmit to conventional electronic devices (e.g. wireless communication devices) using wireless communication protocols.

OFDM signals generally refer to wireless communication signals having data encoded using orthogonal frequency division multiplexing techniques on multiple frequencies. OFDM signals are used in the Institute of Electrical and Electronics Engineers' 802.11 Wi-Fi standards, such as but not limited to, 802.11b, 802.11g, 802.11ac, and/or 802.11ah. OFDM signals may also be used to implement mobile communication standards, such as 4G Long-Term Evolution (LTE).

The helper device 104 may be implemented using any electronic device capable of providing carrier signals (e.g. wireless communication device) described herein. Examples of helper devices include, but are not limited to, routers, mobile communications devices such as cell phones or tablets, computers, and/or laptops. The helper device 104 may generally have a wired power source, although in some examples the helper device 104 may be battery powered. Generally, the helper device 104 may have sufficient power to generate the carrier signal. A single helper device may provide a carrier signal to more than one backscatter device as described herein. Although a single helper device 104 is shown in FIG. 1, any number of helper devices may be used in some examples.

The helper device 104 generally includes RF components, such as frequency synthesizer(s) and/or power amplifiers, which may then not be needed at the backscatter device 108 and/or backscatter device 110. In this manner the helper device 104 may provide the RF functions for any number of backscatter devices, such as backscatter device 108 and backscatter device 110.

The carrier signal provided by the helper device 104 may be any of a variety of wireless signals which may be backscattered by the backscatter device 108 and/or backscatter device 110 to form OFDM signals. The carrier signal may be a continuous wave signal. In some examples, one or more characteristics of the continuous wave signal (e.g. the frequency, amplitude, and/or phase) may be selected in accordance with a particular wireless protocol and/or frequency and/or amplitude and/or phase that the receiver 106 is configured to receive. In some examples, the carrier signal may be a single-frequency tone signal. In some examples, the carrier signal may be a data-free signal. For example, data decodable by the receiver may not be encoded in the carrier signal.

The backscatter device 108 and backscatter device 110 may be implemented using and/or together with any devices having backscatter communication capability, such as, but not limited to, tags, mobile communication devices such as cell phones or tablets, computers, and/or laptops. Other devices may be implemented having backscatter communication capability, including but not limited to sensors, wearable devices such as watches, eyeglasses, contact lenses, and/or medical implants. It is anticipated that the backscatter devices may have a sufficiently small form factor and low power requirement as to be able to be incorporated in or attached to any object and provide communication functionality for the object and/or associated with the object. In this manner, backscatter devices may be placed ubiquitously in an environment, and facilitate Internet of Things (IoT) and/or other ubiquitous sensor functionality. Although two backscatter devices are shown in FIG. 1, it is to be understood that any number of backscatter devices may be used, including one backscatter device. In other examples, 10, 20, 30, 40, 50, 60, 70, 80, 90, 100 or more backscatter devices may be present in the system 102.

Generally, backscatter devices, such as the backscatter device 108 and backscatter device 110 function to present varying impedance to a carrier signal such that, for example, various manipulations (e.g. absorption, reflection, etc.) to the carrier signal are performed, and the carrier signal may be backscattered into a data-carrying signal. Accordingly, in some examples, a data-carrying signal may be provided through backscatter using only the energy required to alter impedance at a backscatter device's antenna. In this manner, the backscatter devices may transmit data-carrying signals at lower power than if the backscatter devices had themselves generated the carrier signals.

Backscatter devices described herein, such as backscatter device 108 and backscatter device 110 may generally be ultra-low power devices. For example, backscatter devices described herein may eliminate or reduce the need for power hungry communication components (e.g. RF signal generators, mixers, analog-to-digital converters, etc., which may be present in the helper device 104). In this manner, backscatter devices described herein may consume microwatts of power to transmit data, which may improve the battery life of the component (e.g. sensor) utilizing the communication capability of the backscatter device. Backscatter devices may perform digital baseband operations, such as coding and/or modulation.

The backscatter signals backscattered by the backscatter device 108 and/or backscatter device 110 may be signals which encode data in accordance with OFDM techniques. In some examples, the backscattered signal may include one or more OFDM packets, decodable at the receiver 106 based on a particular protocol or standard implemented by the receiver 106. In some examples, the backscattered signal may include data detected at the backscatter device 108 and/or backscatter device 110 (e.g. by a sensor of the backscatter device 108 and/or backscatter device 110).

Backscatter devices and/or helper devices described herein, such as backscatter device 108, backscatter device 110, and/or helper device 104, may each include multiple antennas. In this manner, antenna diversity may be leveraged and multiple-input-multiple-output (MIMO) techniques may be used. For example, the helper device 104 may distribute the carrier signal across multiple antennas based on the wireless channel, which may improve wireless signal propagation from the helper device 104 to the backscatter device 108 and/or 110 to the receiver 106.

The receiver 106 may be implemented using any electronic device capable of receiving OFDM signals. Generally, any electronic device (e.g. wireless communication device) may be used to implement receiver 106 including, but not limited to, access points, routers, hubs, mobile communications devices such as cell phones or tablets, computers, and/or laptops. In some examples, the helper device 104, receiver 106, and backscatter device 108 and/or backscatter device 110 may be physically separate devices.

While shown as a separate device from the helper device 104, in some examples the helper device 104 and receiver 106 may be integrated and/or may be the same device. For example, an electronic device may include multiple antennas in some example. One or more antennas in some examples may provide the carrier signal (e.g. provide the helper device 104) while one or more antennas, different from those providing the carrier signal in some examples, may receive the signal transmitted by one or more backscatter devices (e.g. provide the receiver 106). In some examples, the helper device and the receiver may be integrated into a single device. Cancellation circuitry may be provided in the integrated device to suppress (e.g. cancel) the carrier signal transmitted by the helper device at the receiver.

The receiver 106 may receive transmission from the backscatter device 108 and/or backscatter device 110 in the presence of interference from the carrier signal transmitted by the helper device 104. In some examples, specialized hardware may be used by the receiver 106 (e.g. a full-duplex radio) to cancel this interfering signal, however that may not be compatible with existing Wi-Fi devices. In some examples, the helper device 104 may provide a carrier signal that is made up of frequencies (e.g. a single-frequency tone or a multi-frequency signal) outside a desired frequency channel for the transmissions of the backscatter device 108 and/or backscatter device 110. This may ensure and/or aid in the receiver 106 suppressing the out-of-band interference from the helper device 104.

The helper device 104 and receiver 106 described herein may change functionality from time to time in some examples. For example, while the helper device 104 at may function as described with reference to a helper device, the helper device 104 may at times function as a receiver in some examples, while the receiver 106 may function as a helper device at times. For example, a router (e.g. a Wi-Fi router) may be used having multiple modes of operation. In one mode of operation, the router may be used to implement the helper device 104, while in another mode, the router may be used to implement the receiver 106. The same device can time multiplex its functionality in some examples, such that the helper device 104 may be integrated and/or incorporated with the receiver 106.

In some examples, multiple helper devices and/or receivers may be present in a system. In some examples, a single device (e.g. a router) may serve as a helper device at certain times and as a receiver at other times. In some examples, multiple (e.g. two) devices may be present in a system, each able to serve as either a helper device or a receiver. For example, the device may function as a helper device (e.g. be configured to transmit a carrier signal) in one mode, and a receiver (e.g. be configured to receive a backscattered signal) in a second mode. Accordingly, the two devices may trade off serving as the helper device at any instance of time. For example, at one time Router 1 may function as the helper device whereas Router 2 may function as the receiver and at another time instant the roles may be reversed. Different time allocations may be used in some examples and a larger number of routers may be present in some examples.

In examples having multiple helper devices and/or receivers, the helper devices and/or receivers may be positioned across an area to maximize and/or improve spatial coverage by the carrier signal and/or spatial coverage for receipt of backscattered signals. In some examples, a helper device of the plurality of helper devices in a system may be selected to act as a helper device (in some examples, the selection may be specific to a specific backscatter device or group of backscatter devices) based on proximity of the candidate helper device to the backscatter device. In some examples, the selection may be made based on a candidate helper device of the plurality of helper devices having a better reception of a backscattered signal than another of the plurality of helper devices.

Figure 2:
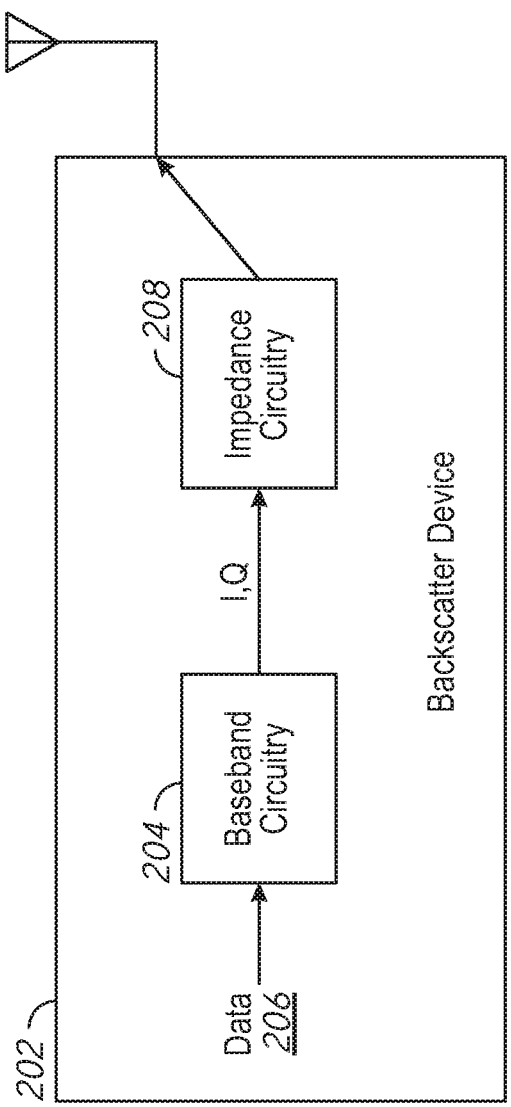
FIG. 2 is a schematic illustration of a backscatter device arranged in accordance with examples described herein.

FIG. 2 is a schematic illustration of a backscatter device arranged in accordance with examples described herein. The backscatter device 202 includes and antenna, baseband circuitry 204, and impedance circuitry 208. During operation, the backscatter device 202 may provide data 206 which may be operated on by baseband circuitry 204 and impedance circuitry 208 to modulate an impedance of the antenna to backscatter a carrier signal and provide a backscattered signal including OFDM packets containing the data 206. The backscatter device 202 may be used to implement and/or may be implemented by the backscatter device 108 and/or the backscatter device 110 of FIG. 1 in some examples.

Data 206 may be provided by and/or communicated to the backscatter device 202. For example, the backscatter device 202 may be in communication with and/or integrated with a sensor, and the data 206 may include sensor data regarding an environment proximate the backscatter device 202 and/or sensor (e.g. temperature, image, video, humidity).

The baseband circuitry 204 may operate at a baseband frequency to generate inphase (e.g. I) and quadrature (e.g. Q) bits from the data 206 in accordance with OFDM techniques. For example, the baseband circuitry 204 may implement a serial-to-parallel conversion, an IFFT, a mapping to different sub-carrier frequencies, a cyclic prefix adder, a parallel-to-serial converter, a combiner, and/or an analog-to-digital converter.

Figure 3:
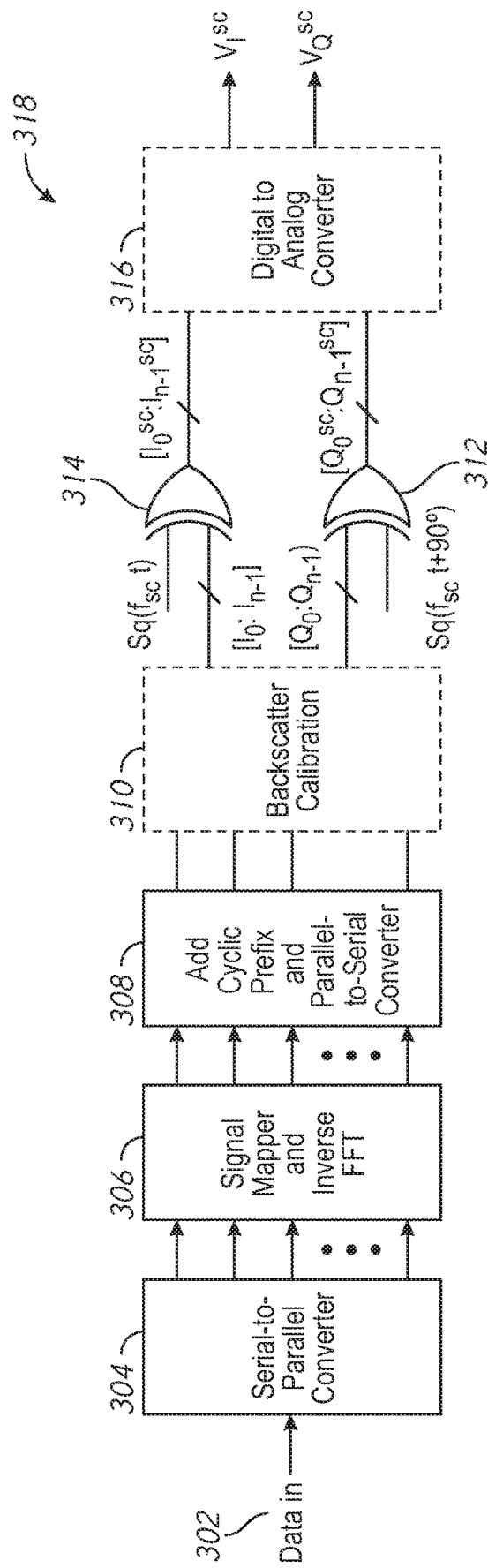
FIG. 3 is an example of baseband circuitry arranged in accordance with examples described herein.

The impedance circuitry 208 may change the impedance at the antenna in accordance with the inphase and quadrature bits so as to backscatter an incident carrier signal to provide a backscatter signal including OFDM packets corresponding to the data 206. In some examples, the impedance circuitry 208 includes first circuitry that may provide a real component of an antenna impedance and second circuitry which may provide an imaginary component of an antenna impedance. In this manner, the real and imaginary components of the antenna impedance may be independently controlled based on the inphase and quadrature bits, respectively. FIG. 3 is an example of baseband circuitry arranged in accordance with examples described herein. The baseband circuitry 318 may include serial-to-parallel converter 304, signal mapper and IFFT 306, cyclic prefix adder and parallel-to-serial converter 308, calibration 310, combiner 312, combiner 314, and digital to analog converter 316. In some examples, the baseband circuitry 318 may be used to implement and/or may be implemented by baseband circuitry 204 of FIG. 2.

During operation, the baseband circuitry 318 may function to convert data provided by a backscatter device (e.g. Data 302 of FIG. 3 and/or data 206 of FIG. 2) into inphase and quadrature bits in accordance with OFDM techniques. Accordingly, the baseband circuitry 318 generally takes input data, converts the data into a parallel stream, performs an inverse Fourier transform (IFFT) and then maps onto the sub-carrier.

The baseband circuitry 318 may be implemented using a variety of components, including one or more processors and memory encoded with executable instructions to perform functions described herein with reference to serial-to-parallel converter 304, signal mapper and IFFT 306, cyclic prefix adder and parallel-to-serial converter 308, calibration 310, combiner 312, combiner 314, and/or digital to analog converter 316. Some or all of the components may be implemented utilizing specialized hardware (e.g. ASIC or other circuitry).

OFDM generally refers to a modulation scheme used by IEEE 802.11 g/n/ac/ah Wi-Fi standards for reliable and high data rate wireless communication. OFDM generally uses a number of parallel narrow-band subcarriers instead of a single wide-band carrier to transmit information. As a result, OFDM may be advantageous in dealing with frequency selective multi-path environments and is robust against narrow-band interference.

OFDM packet generation generally involves scrambling, convolution encoding, puncturing and interleaving operations. These operations can be implemented in baseband digital at low power in some examples. The data 302 may represent data after scrambling, convolution encoding, puncturing and interleaving in some examples. To encode the data 302 using OFDM, the data 302 may be split into N parallel streams corresponding to N subcarriers. The serial-to-parallel converter 304 may split the data 302 into those N parallel streams. Generally any number N of streams may be used.

An output of the serial-to-parallel converter 304 may then be supplied to signal mapper and IFFT 306. The signal mapper and IFFT 306 may map the parallel data from the serial-to-parallel converter 304 to different subcarriers and perform an IFFT to provide inverse transform data. During this process, pilot symbols may be added to specific frequency bins by the signal mapper and IFFT 306.

The inverse transform data may be provided to the cyclic prefix adder and parallel-to-serial converter 308. A guard interval including a cyclic prefix may be added to the inverse transform data by the cyclic prefix adder and parallel-to-serial converter 308. For example, the cyclic prefix adder and parallel-to-serial converter 308 may repeat a last few time samples (e.g. a size larger than the channel impulse response) at the beginning. The cyclic prefix adder and parallel-to-serial converter 308 may then convert the data back to serial digital data.

The serial digital data may include a stream of inphase (e.g. $I_0:I_{n-1}$) and quadrature (e.g. $Q_0:Q_{n-1}$) bits. Any number of bits may be used. In some examples of Wi-Fi standards, typically 8-10 bits of resolution may be used for transmission of standards compliant Wi-Fi packets.

Combiner 312 and combiner 314 may be used to up-convert the quadrature and inphase bits, respectively, to a higher subcarrier frequency. The combiner 312 and combiner 314 may be implemented using XOR gates as shown in FIG. 3. Other components may be used in other examples, including other logic gates and/or mixers. The combiner 312 and combiner 314 are implemented using XOR gates shown in FIG. 3. The combiner 312 may XOR the quadrature bits with a square wave having a 90 degree phase shift from a square wave used by the combiner 314 to XOR the inphase bits. The square waves operate at an offset frequency of Δf. The offset frequency Δf may typically be 13.75 MHz or higher in some examples.

In other examples, to implement sub-carrier modulation, the digital bits output from the cyclic prefix adder and parallel-to-serial converter 308 and/or calibration 310 may be converted into an analog domain and up-conversion may be performed in the analog domain using a mixer. However, analog mixers may not be desired in some examples.

Having provided inphase and quadrature bits, a variety of techniques described herein may be used to transmit the inphase and quadrature bits using backscatter communication. In some examples, digital to analog converter 316 may convert the digital data into an analog domain. The OFDM operations may be implemented in digital baseband and the final output of the digital to analog converter 316 may include two analog voltages—$V_i$ corresponding to the inphase bits, and $V_Q$ corresponding to the quadrature bits. Examples described herein include techniques for transmitting this complex signal (e.g. the analog signals corresponding to the inphase and quadrature bits) using backscatter.

However, in some examples, the relationship between the output impedance provided by impedance circuitry described herein (e.g. with reference to FIG. 4-FIG. 7) and input voltages (e.g. $V_Q$ and VI as output from digital to analog converter 316) may not be linear. Accordingly, in some examples calibration 310 may be provided which may be a calibration block in the digital domain which maps the input control voltages to the respective full dynamic range impedances in the backscatter network. Calibration 310 may correct for non-linearity according to the equations provided herein, process variations, mismatches, distortion, parasitics, temperature variations and others. Calibration 310 may be implemented, for example, using a lookup table or custom circuitry that adjusts an output based on an input such that analog output voltages from digital to analog converter 316 may have a linear relationship, or closer to a linear relationship, with impedances provided by examples of impedance circuitry described herein (e.g. with reference to FIG. 4-FIG. 7). In some examples, calibration 310 may be calibrated, e.g. at a time of manufacture or on-site.

In some examples, the inphase and quadrature bits may be directly transmitted using backscatter techniques. For example, the digital to analog conversion operation may be integrated with the backscatter modulation, and the digital to analog converter 316 may not be present and/or used. The complex signal may be transmitted using backscatter as described herein.

Generally, examples described herein may generate complex backscatter signals (e.g. backscatter signals having real and imaginary components). Helper devices described herein may provide a carrier signal. The carrier signal may be incident on a backscatter device (e.g. an antenna of a backscatter device), and a backscatter signal may be generated by backscattering the carrier signal by changing an antenna impedance at the backscatter device. Generally, the signal backscattered by the antenna, $E_{scattered}$, may be given by $$E^{scattered} = kE^{inc}(1+\Gamma^*) \qquad \text{Equation 1}$$

where $E_{inc}$ is the incident signal (e.g. the carrier signal) and k is a coefficient which models the antenna parameters. $\Gamma^*$ is the complex reflection coefficient and may be given by $$\Gamma^* = \frac{Z_a^* - Z_{in}}{Z_a + Z_{in}} \qquad \text{Equations 2 and 3}$$
$$1 + \Gamma^* = \frac{2\text{Re}\{Z_a\}}{Z_a + Z_{in}}$$

where Za is the impedance of the antenna and Zin represents the impedance connected to the antenna. Impedance is complex and includes real and imaginary components. The impedance connected to the antenna can be varied by using different approaches. If only the real part of the impedance is varied, the inphase component of an OFDM signal may be provided. Similarly, varying the imaginary component of the impedance may create the quadrature component of the OFDM signal.

Frequencies of the carrier signal, the operation of the baseband frequency, and the subcarrier frequency (e.g. the signal mixed with the baseband, for example the square wave input to the combiner 312 and/or combiner 314) may vary in accordance with the protocol(s) used.

For example, the IEEE 802.11 ah protocol generally operates in the 915 MHz ISM band in the US (and/or the 868 MHz band in Europe). The carrier signal may be provided having a frequency between 902-928 MHz. The baseband circuitry may operate at a few MHz's in some examples depending on a bandwidth of the channel (e.g. 1/2/4/8/16 MHz). Typical values in some examples may be 1 or 2 or 4 or 8 or 16 MHz. The subcarrier signal (e.g. square wave input to combiner 312 and/or combiner 314) may be in the similar frequency range. As a rule of thumb, the subcarrier may be at a frequency which is 0.75*channel bandwidth. Other relationships may be used in other examples. So, for this protocol example, the sub-carrier frequency may be 0.75 or 1.5 or 3 or 6 or 12 MHz. The sub-carrier frequency may be varied depending on the deployment without deleteriously impacting the system in some examples.

In some examples, the IEEE 802.11 g/n Wi-Fi protocol may be used, which operates in the 2.4 GHz ISM band. The carrier signal may have a frequency between 2.4-2.5 GHz in some examples. The baseband circuitry may operate at 10 or 20 MHz depending on the bandwidth of the channel (e.g. 20 or 40 MHz) in some examples. The subcarrier signal (e.g. square wave provided to combiner 312 and/or combiner 314) may be in the similar frequency range of 16.5 or 33 MHz in some examples. The sub-carrier frequency may be varied depending on the deployment without deleteriously impacting the system in some examples.

In some examples, the IEEE 802.11 n/ac may be used, which operates in the 5.8 GHz ISM band. The carrier signal may have a frequency between 5.725-5.875 GHz in some examples. The baseband circuitry may operate at 10 or 20 or 40 MHz depending on the bandwidth of the channel (e.g. 20 or 40 or 80 MHz). The subcarrier signal (e.g. square wave provided to combiner 312 and/or combiner 314) may be in the similar frequency range of 16.5 or 33 or 66 MHz in some examples. The sub-carrier frequency may be varied depending on the deployment without deleteriously impacting the system in some examples.

Figure 4:
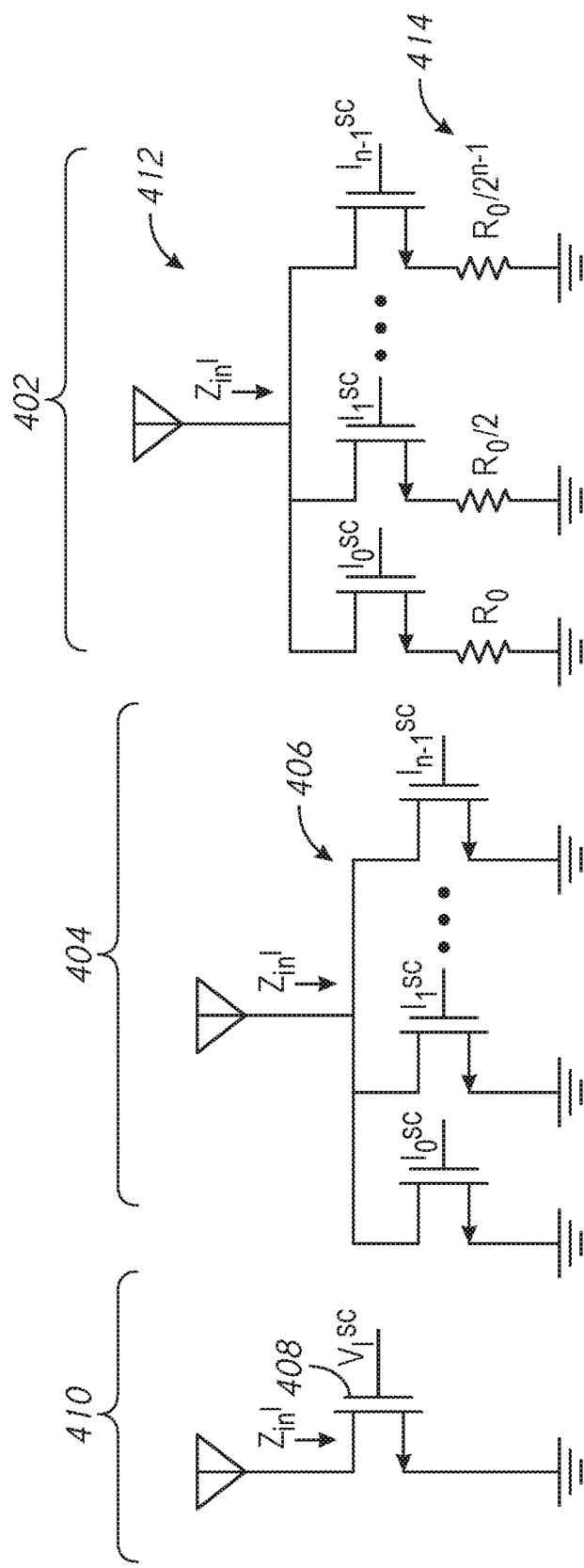
FIG. 4 is a schematic illustration of circuitry which may be used to vary a real component of antenna impedance arranged in accordance with examples described herein.

FIG. 4 is a schematic illustration of circuitry which may be used to vary a real component of antenna impedance arranged in accordance with examples described herein. FIG. 4 includes three examples of circuitry which may be used to vary a real component of antenna impedance-impedance circuitry 410, impedance circuitry 404, and impedance circuitry 402. The impedance circuitry 410, impedance circuitry 404, and/or impedance circuitry 402 may be used to implement and/or may be implemented by portions of impedance circuitry 208 of FIG. 2 in some examples. The impedance circuitry 410, impedance circuitry 404, and/or impedance circuitry 402 may modulate a real component of the impedance at an antenna of a backscatter device and may create the inphase components of a backscatter signal that includes one or more OFDM packets.

Impedance circuitry 410 includes transistor 408 coupled to an antenna. The transistor 408 may be a field effect transistor (FET) and may be a radio frequency (RF) FET in some examples. A voltage applied at the gate of the transistor 408 may be based on the inphase bits to modulate a real component of the impedance at the antenna. For example, the voltage applied at the gate of the transistor 408 may be based on an analog conversion of the inphase bits. For example, the voltage applied at the gate of transistor 408 may be the $V_1$ output from the digital to analog converter 316 of FIG. 3 in some examples. In some examples, the voltage applied at the gate of transistor 408 may be based on the $V_1$ output from the digital to analog converter 316. The transistor 408 may accordingly modulate the impedance connected to the antenna in accordance with the voltage on its gate. For the configuration shown in impedance circuitry 410 and a gate to source voltage of $V_1$ s, the resistance of the transistor 408 can be written as $$Z_{in}^I = R_{ON} \qquad \text{Equation 4}$$
$$= \frac{1}{\mu_n C_{ox} \frac{W}{L}(V_I^{SC} - V_{th})}$$
$$= \frac{1}{k_I(V_I^{SC} - V_{th})}$$
$$= \frac{1}{k_I' V_I^{SC}}$$

where $V_{th}$ is the threshold voltage of the transistor 408 and $k_1$ is a parameter based on attributes of the transistor 408 (e.g. the carrier mobility μ, oxide capacitance $C_{ox}$, and width W and length L). In this manner, the inphase component of a DAC output $V_1$ may be used as an input to the impedance circuitry 410. The impedance circuitry 410 may accordingly modulate the real component of impedance at the antenna based on the output of a digital-to-analog converter.

Impedance circuitry 404 and impedance circuitry 402 utilize digital outputs from the baseband circuitry (e.g. the Q and I bits shown in FIG. 2 and/or FIG. 3) and utilize them to directly modulate the impedance at the antenna. In this manner, the DAC functionality may be integrated into the backscatter impedance network, and digital to analog converter 316 may not be needed in some examples. Impedance circuitry 404 includes a plurality of transistors 406. Each of the plurality of transistors 406 has a drain/source terminal coupled to the antenna. The plurality of transistors 406 may be implemented using FETs, and may in some examples be binary weighted transistors (e.g. binary weighted FETs). For example, a number n of FETs may be used, which may correspond to an n bit output from the baseband circuitry. The plurality of transistors 406 may be sized (e.g. their width to length ratio may be selected) such that the resistance of each of the plurality of transistors 406 is half of that of the previous transistor (e.g. from bit 0 to bit n−1). Since the input conductance of a series of FETs connected in parallel as shown with the plurality of transistors 406 is a sum of their individual conductances, the overall impedance at the antenna in impedance circuitry 404 may be written as:

$$\frac{1}{Z_{in}^I} = \sum_{i=0}^{n-1} \frac{1}{R_i} = \sum_{i=0}^{n-1} 2^i k_I I_i^{SC} \qquad \text{Equation 5}$$

where the parameter $k_I$ may be given as $\mu C_{ox} W/L$ for the 0th bit. In this manner, n inphase bits (e.g. an output of baseband circuitry 204 of FIG. 2 and/or an output of combiner 314 of FIG. 3) may be provided as inputs to the plurality of transistors 406 to set a real component of impedance at an antenna.

Impedance circuitry 402 is another example of impedance circuitry which may be used to provide a real component of impedance at an antenna based on inphase bits. Impedance circuitry 402 includes a plurality of transistors 412 and a plurality of resistors 414. The plurality of transistors 412 each have a source/drain terminal coupled to the antenna and another source/drain terminal coupled to one of the plurality of resistors 414. There may be n number of transistors and resistors, corresponding to n inphase bits. The plurality of resistors 414 may be a set of inverse binary weighted resistors. The binary weighted resistors may have resistances such that the resistance of the each resistor (from bit 0 to n−1) is half of that of the previous one as shown in FIG. 4. The plurality of transistors 412 may be implemented as FETs, which may operate as switches in impedance circuitry 402 and may have negligible impedance (e.g. compared to the impedance being switched in by the plurality of resistors 414). The overall impedance at the antenna in impedance circuitry 402 can be written as $$\frac{1}{Z_{in}^{I}} = \sum_{i=0}^{n-1} \frac{1}{R_i} = \sum_{i=0}^{n-1} \frac{2^i I_i^{SC}}{R_0} \qquad \text{Equation 6}$$

The inphase bits (e.g. an output of baseband circuitry 204 of FIG. 2 and/or an output of combiner 314 of FIG. 3) may be provided as inputs at the gates of the plurality of transistors 412 to switch in corresponding ones of the plurality of resistors 414. Accordingly, impedance circuitry 402 may set a real component of resistance at an antenna based on inphase bits.

Figure 5:
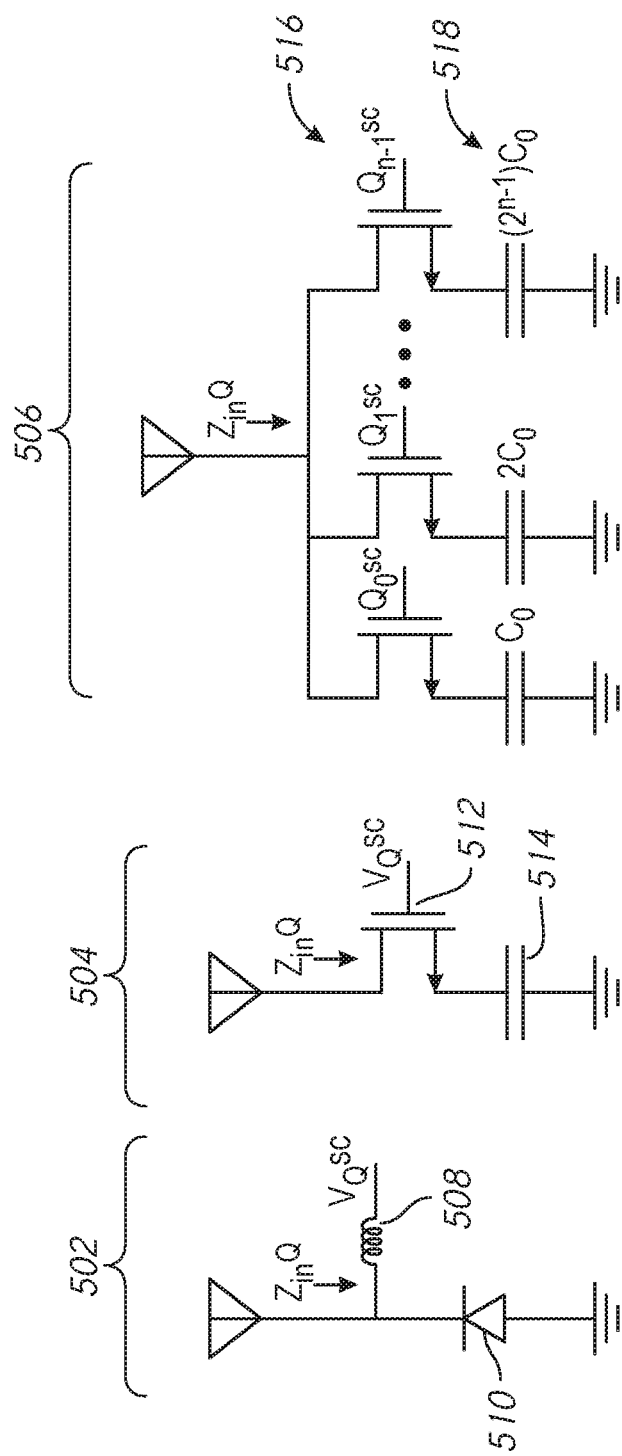
FIG. 5 is a schematic illustration of examples of impedance circuitry which may provide an imaginary component of impedance at an antenna.

FIG. 5 is a schematic illustration of examples of impedance circuitry which may provide an imaginary component of impedance at an antenna. FIG. 5 includes three examples of circuitry which may be used to vary an imaginary component of antenna impedance-impedance circuitry 502, impedance circuitry 504, and impedance circuitry 506. The impedance circuitry 502, impedance circuitry 504, and/or impedance circuitry 506 may be used to implement and/or may be implemented by portions of impedance circuitry 208 of FIG. 2 in some examples. The impedance circuitry 502, impedance circuitry 504, and/or impedance circuitry 506 may modulate an imaginary component of the impedance at an antenna of a backscatter device and may create the quadrature components of a backscatter signal that includes one or more OFDM packets.

The impedance circuitry 502 uses the quadrature phase analog output of a digital to analog converter (e.g. Digital to analog converter 316 of FIG. 3) to modulate the imaginary component of the impedance connected to the antenna. Accordingly, impedance circuitry 502 may use analog conversions of quadrature bits to modulate the imaginary component of the impedance of the antenna. The impedance circuitry 502 includes inductor 508 coupled between the antenna and the input analog quadrature voltage $V_Q$. The impedance circuitry 502 further includes varactor 510 coupled between the antenna and a reference voltage (e.g. ground). The varactor 510 may modulate a capacitance connected to the antenna. The inductor 508 may serve as a high pass filter which may isolate an output of a digital to analog converter (e.g. Digital to analog converter 316 of FIG. 3) from an incoming RF signal. The input impedance connected to the antenna in impedance circuitry 502 can be written as $$Z_{in}^{Q} = \frac{1}{j\omega C_{var}} = \frac{1}{j\omega \frac{C_0}{\left(1+\frac{V_Q^{SC}}{\phi_B}\right)^m}} = \frac{\left(1+\frac{V_Q^{SC}}{\phi_B}\right)^m}{j\omega C_0} \qquad \text{Equation 7}$$

where $C_{var}$ is the capacitance of the varactor and $V_Q^{SC}$ is the analog converted quadrature bits form a digital to analog converter (e.g. digital to analog converter 316). $\phi_B$ is the built in potential, $C_0$ is the zero bias capacitance, and m refers to the slope of the Log C vs. Log V curve, which are generally used for calculating varactor capacitance.

Impedance circuitry 504 also uses analog converted quadrature bits (e.g. the quadrature output of the DAC). impedance circuitry 504 includes transistor 512 and capacitor 514. The transistor 512 may be a FET and may have a source/drain coupled to the antenna of a backscatter device. The other source/drain may be coupled to capacitor 514. Accordingly, the capacitor 514 may be in series with the transistor 512. The capacitor 514 may be coupled between the transistor 512 and a reference voltage (e.g. ground). The analog converted quadrature bits (e.g. the quadrature output of digital to analog converter 316 of FIG. 3) may be provided to a gate of transistor 512. The input impedance seen by the antenna may accordingly vary in accordance with the analog converted quadrature bits, and may be written as $$Z_{in}^{Q} = R_{ON} + Z_C \qquad \text{Equation 8}$$
$$= \frac{1}{\mu_n C_{ox} \frac{W}{L}(V_Q^{SC}-V_{th})} + \frac{1}{(j\omega C)}$$
$$= \frac{1}{k_Q V_Q^{'SC}} + \frac{1}{(j\omega C)}$$
$$= \frac{j\omega C + k_Q V_Q^{'SC}}{(j\omega C)(k_Q V_Q^{'SC})}$$

Accordingly, impedance circuitry 504 may be utilized to vary a complex component of impedance at the antenna in accordance with the quadrature bits.

Impedance circuitry 506 may be used in some examples to provide a complex component of impedance at a backscatter device antenna in accordance with quadrature bits. When impedance circuitry 506 is used, the digital quadrature bits themselves may be used as inputs to impedance circuitry 506, and accordingly a digital to analog converter (e.g. Digital to analog converter 316) may not be needed.

Impedance circuitry 506 includes a plurality of transistors 516 and a plurality of capacitors 518. The plurality of transistors 516 each have a source/drain terminal coupled to the antenna and another source/drain terminal coupled to one of the plurality of capacitors 518. There may be n number of transistors and resistors, corresponding to n quadrature bits. The plurality of capacitors 518 may be a set of binary weighted capacitors. The binary weighted capacitors may have capacitances such that the capacitance of each capacitor (from bit 0 to n−1) is twice of that of the previous one as shown in FIG. 5. The plurality of transistors 516 may be implemented as FETs, which may operate as switches in plurality of transistors 516 and may have negligible impedance (e.g. compared to the impedance being switched in by the plurality of capacitors 518). The overall impedance at the antenna in impedance circuitry 506 can be written as $$Z_{in}^{Q} = \frac{1}{j\omega C_{total}} = \frac{1}{j\omega \sum_{i=0}^{n-1} 2^i C_0 Q_i^{SC}} \qquad \text{Equation 9}$$

The quadrature bits (e.g. an output of baseband circuitry 204 of FIG. 2 and/or an output of combiner 312 of FIG. 3)

may be provided as inputs at the gates of the plurality of transistors 516 to switch in corresponding ones of the plurality of capacitors 518. Accordingly, impedance circuitry 506 may set an imaginary component of resistance at an antenna based on quadrature bits.

As described herein, impedance circuitry may be used to generate real and imaginary components of impedance at an antenna based on inphase and quadrature bits. The real and imaginary components of the impedance may be combined to synthesize OFDM packets. Accordingly antennas for backscatter devices described herein may be coupled to two sets of circuitry—one to provide a real component of the impedance in accordance with inphase bits and another to provide an imaginary component of the impedance in accordance with the quadrature bits. In some examples, an I/Q digital to analog converter (DAC) (e.g. the digital to analog converter 316 of FIG. 3) may be used to provide analog output values to the impedance circuitry to generate OFDM packets. Accordingly, the I/Q DAC may be integrated with an RF backscatter switch in examples described herein to provide an integrated backscatter switch network to synthesize OFDM packets.

Accordingly, some examples utilize analog output values as input to impedance circuitry to generate both the real and imaginary components of the impedance. Baseband circuitry (e.g. Baseband circuitry 318 of FIG. 3) may be used to synthesize OFDM packets in the digital domain. The digital data may be upconverted to a sub-carrier frequency (e.g. utilizing combiner 312 and combiner 314). The upconverted data may be converted to the analog domain, e.g. by digital to analog converter 316 to provide an in phase analog voltage (e.g. $V_I^{SC}$) and a quadrature phase analog voltage ($V_Q^{SC}$) based on the inphase and quadrature bits (e.g. I, Q). The in phase and quadrature phase analog voltages may be combined to generate the OFDM packet.

Accordingly, two impedance circuitry components may be coupled to backscatter device antennas—one to provide a real component of the impedance in accordance with inphase bits from baseband circuitry, and another to provide an imaginary component of the impedance in accordance with quadrature bits from the baseband circuitry.

Figure 6:
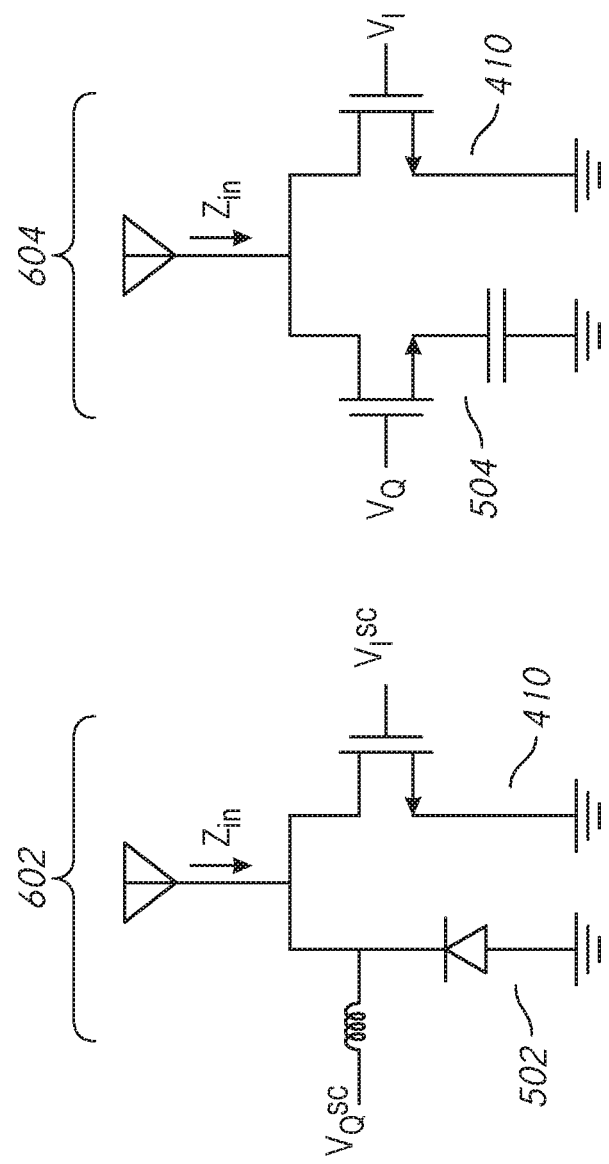
FIG. 6 is a schematic illustration of two example architectures for impedance circuitry providing both a real and imaginary component of impedance arranged in accordance with examples described herein.

FIG. 6 is a schematic illustration of two example architectures for impedance circuitry providing both a real and imaginary component of impedance arranged in accordance with examples described herein. Impedance circuitry 602 provides impedance circuitry 502 and impedance circuitry 410 both coupled to an antenna—where impedance circuitry 502 may provide an imaginary component of impedance in accordance with analog converted quadrature bits and impedance circuitry 410 may provide a real component of impedance in accordance with analog converted inphase bits. The impedance circuitry 410, as described herein, may utilize a single FET to generate the in-phase component. The impedance circuitry 502, as described herein, may use a varactor to generate the quadrature phase component. Impedance circuitry 410 and impedance circuitry 502 are connected in parallel and the impedance seen by the antenna in impedance circuitry 602 can be written as $$\frac{1}{Z_{in}} = \frac{1}{Z_{in}^I} + \frac{1}{Z_{in}^Q}$$ Equation 10

$$= k_I V_I^{\prime SC} + j\omega C_{var}$$

$$= k_I V_I^{\prime SC} + \frac{j\omega C_0}{\left(1 + \frac{V_Q^{SC}}{\phi_B}\right)^m}$$

Impedance circuitry 604 provides another example of impedance circuitry that may vary both a complex and imaginary component of antenna impedance in accordance with quadrature an inphase bits. Impedance circuitry 604 provides impedance circuitry 504 and impedance circuitry 410 both coupled to an antenna—where impedance circuitry 504 may provide an imaginary component of impedance in accordance with analog converted quadrature bits and impedance circuitry 410 may provide a real component of impedance in accordance with analog converted inphase bits. The impedance circuitry 410, as described herein, may utilize a single FET to generate the in-phase component. The impedance circuitry 504 as described herein, may use another transistor to generate the quadrature phase component. Impedance circuitry 410 and impedance circuitry 504 are connected in parallel and the impedance seen by the antenna in impedance circuitry 604 can be written as $$\frac{1}{Z_{in}} = \frac{1}{Z_{in}^I} + \frac{1}{Z_{in}^Q}$$ Equation 11

$$= k_I V_I^{\prime SC} + \frac{(j\omega C)(k_Q V_Q^{\prime SC})}{j\omega C + k_Q V_Q^{\prime SC}}$$

$$= k_I V_I^{\prime SC} + \frac{(j\omega C)(k_Q V_Q^{\prime SC})(-j\omega C + k_Q V_Q^{\prime SC})}{j\omega C + k_Q V_Q^{\prime SC}(-j\omega C + k_Q V_Q^{\prime SC})}$$

$$= k_I V_I^{\prime SC} + \frac{k_Q V_Q^{\prime SC} \omega^2 C^2 + j\omega C(k_Q V_Q^{\prime SC})^2}{\sqrt{(k_Q V_Q^{\prime SC})^2 + (\omega C)^2}}$$

$$= \left(k_I V_I^{\prime SC} + \frac{k_Q V_Q^{\prime SC} \omega^2 C^2}{\sqrt{(k_Q V_Q^{\prime SC})^2 + (\omega C)^2}}\right) +$$

$$j\left(\frac{\omega C(k_Q V_Q^{\prime SC})^2}{\sqrt{(k_Q V_Q^{\prime SC})^2 + (\omega C)^2}}\right)$$

In both impedance circuitry 602 and impedance circuitry 604, converted analog inphase and quadrature bits (e.g. $V_I^{SC}$ and $V_Q^{SC}$ may be used as inputs to the impedance circuitry to control the real and imaginary components of the antenna impedance. This impedance translates to the signal backscattered by the antenna as may be given by Equation 2 and as a complex waveform such as OFDM packets may be transmitted by backscatter devices described herein.

As described herein, in some examples, a baseband digital to analog converter (e.g. Digital to analog converter 316 of FIG. 3) may not be used. Instead, an output of the cyclic prefix adder and parallel-to-serial converter 308 and/or combiner 312 and combiner 314 (and/or an output of the calibration 310) may be n bit digital outputs corresponding to the inphase and quadrature bits. Those bits may themselves serve as input to examples of impedance circuitry described herein.

For example, the inphase bits may be provided as input to a plurality of transistors used to switch in resistors (or resistive elements) to provide a real component of the impedance—for example, impedance circuitry 402 of FIG. 4. The quadrature bits may be provided as input to a plurality of transistors used to switch in capacitors to provide an imaginary component of the impedance—for example, impedance circuitry 506 of FIG. 5.

Figure 7:
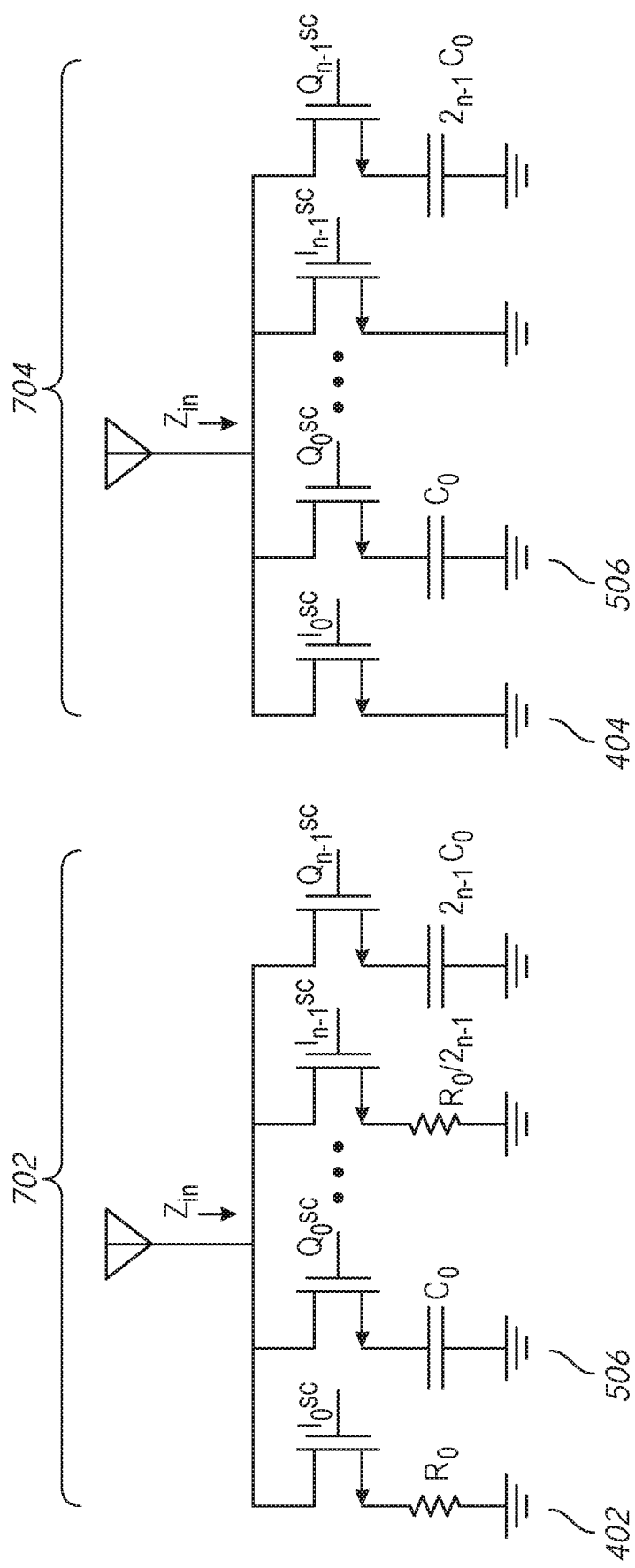
FIG. 7 is a schematic illustration of two example architectures for impedance circuitry providing both a real and imaginary component of impedance arranged in accordance with examples described herein.

FIG. 7 is a schematic illustration of two example architectures for impedance circuitry providing both a real and imaginary component of impedance arranged in accordance with examples described herein. Impedance circuitry 702 includes impedance circuitry 402 and impedance circuitry 506 coupled in parallel to provide real and imaginary components of the impedance. Impedance circuitry 402 may utilize binary weighted resistors, as described herein, and impedance circuitry 506 may utilize binary weighted capacitors as described herein.

The total input impedance of the backscatter switch network for impedance circuitry 702 may be written as:

$$\frac{1}{Z_{in}} = \frac{1}{Z_{I_0}} + \frac{1}{Z_{I_1}} + \ldots + \frac{1}{Z_{I_{n-1}}} +$$
$$\frac{1}{Z_{Q_0}} + \frac{1}{Z_{Q_1}} + \ldots + \frac{1}{Z_{Q_{n-1}}}$$
$$= \frac{I_0^{SC}}{R_0} + \frac{2I_1^{SC}}{R_0} + \ldots + \frac{2^{n-1}I_{n-1}^{SC}}{R_0} +$$
$$j\omega C_0 Q_0^{SC} + j\omega 2 C_0 Q_1^{SC} + \ldots +$$
$$j\omega 2^{n-1} C_0 Q_{n-1}^{SC}$$

Equation 12

Accordingly, impedance circuitry 702 may be used to implement a digital to analog (DAC) converter in the backscatter switch network (e.g. in the impedance circuitry itself).

Impedance circuitry 704 utilizes impedance circuitry 404 and impedance circuitry 506 to provide the real and imaginary components of the impedance, respectively. Impedance circuitry 404 may utilize binary weighted sized FETs acting as resistors and may be used to vary the real component of the impedance in accordance with inphase bits. Impedance circuitry 506 may switch capacitors in to vary the imaginary component of the impedance in accordance with the quadrature bits. The input impedance for this backscatter switch network of impedance circuitry 704 can we written as:

$$\frac{1}{Z_{in}} = \frac{1}{Z_{I_0}} + \frac{1}{Z_{I_1}} + \ldots + \frac{1}{Z_{I_{n-1}}} +$$
$$\frac{1}{Z_{Q_0}} + \frac{1}{Z_{Q_1}} + \ldots + \frac{1}{Z_{Q_{n-1}}}$$
$$= k_I I_0^{SC} + 2k_I I_1^{SC} + \ldots + 2^{n-1} k_I I_{n-1}^{SC} +$$
$$j\omega C_0 Q_0^{SC} + j\omega 2 C_0 Q_1^{SC} + \ldots +$$
$$j\omega 2^{n-1} C_0 Q_{n-1}^{SC}$$

Equation 13

This impedance controlled by the inphase and quadrature bits translates to the signal backscattered by the antenna as may be given, for example, by Equation 2. Accordingly, backscatter devices described herein may transmit a complex waveform such as OFDM packets. A calibration block in the digital domain (e.g. Calibration 310) may be used to map the input control voltages to the respective full dynamic range impedances in the backscatter network. Calibration 310 may correct for non-linearity according equations described herein, process variations, mismatches, distortion, parasitics, temperature variations and others.

Accordingly, devices, systems, and methods described herein may reduce the power required to transmit OFDM packets in some examples. The analog RF front may be separated from the baseband and the power hungry operations may be delegated to a helper device. Complex analog backscatter techniques may be used to generate OFDM packets using reflections which may offer orders of magnitude low power compared to traditional Wi-Fi radios. This may allow backscatter devices to communicate in accordance with the 802.11 g/n/ac/ah Wi-Fi and LTE protocols.

From the foregoing it will be appreciated that, although specific embodiments of the invention have been described herein for purposes of illustration, various modifications may be made without deviating from the spirit and scope of the invention.

What is claimed is:

1. A backscatter device comprising:
   an antenna;
   baseband circuitry configured to provide inphase bits and quadrature bits corresponding to data for transmission, wherein the baseband circuitry includes a first combiner configured to upconvert by combining at least some of the data with a first subcarrier square wave and a second combiner configured to upconvert at least some of the data with a second subcarrier square wave having a 90 degree phase shift from the first subcarrier square wave;
   first circuitry coupled to the antenna and the baseband circuitry and configured to provide a real component of antenna impedance corresponding to the inphase bits; and
   second circuitry coupled to the antenna and the baseband circuitry and configured to provide an imaginary component of the antenna impedance corresponding to the quadrature bits, and wherein the backscatter device is configured to provide a backscatter signal including orthogonal frequency division multiplexing (OFDM) packets in accordance with the inphase bits and the quadrature bits.

2. The backscatter device of claim 1, wherein the first circuitry comprises a plurality of binary weighted transistors connected in parallel, and wherein the plurality of binary weighted transistors are each configured to receive a respective one of the inphase bits at their gate.

3. The backscatter device of claim 1, wherein the first circuitry comprises a plurality of transistors, each configured to couple a respective one of a plurality of resistors to the antenna based on a respective gate voltage, and wherein the plurality of transistors are each configured to receive a respective one of the inphase bits at their gate.

4. The backscatter device of claim 1, wherein the second circuitry comprises a transistor coupled to the antenna and a varactor coupled between the antenna and a reference voltage, wherein the transistor includes a gate configured to receive a voltage based on an analog conversion of the quadrature bits.

5. The backscatter device of claim 1, wherein the second circuitry, comprises a plurality of transistors, each configured to couple a respective one of a plurality of capacitors to the antenna based on a respective gate voltage, and wherein the plurality of transistors are each configured to receive a respective one of the quadrature bits at their gate.

6. The backscatter device of claim 5, wherein the plurality of capacitors comprise a plurality of binary weighted capacitors.

7. A backscatter device comprising:
   an antenna;
   baseband circuitry configured to provide inphase bits and quadrature bits corresponding to data for transmission;

first circuitry coupled to the antenna and the baseband circuitry and configured to provide a real component of antenna impedance corresponding to the inphase bits; and second circuitry coupled to the antenna and the baseband circuitry and configured to provide an imaginary component of the antenna impedance corresponding to the quadrature bits, wherein the first circuitry comprises a transistor coupled to the antenna and wherein the transistor includes a gate configured to receive a voltage based on an analog conversion of the inphase bits, and wherein the backscatter device is configured to provide a backscatter signal including orthogonal frequency division multiplexing (OFDM) packets in accordance with the inphase bits and the quadrature bits.

8. A backscatter device comprising:

an antenna;

baseband circuitry configured to provide inphase bits and quadrature bits corresponding to data for transmission;

first circuitry coupled to the antenna and the baseband circuitry and configured to provide a real component of antenna impedance corresponding to the inphase bits; and second circuitry coupled to the antenna and the baseband circuitry and configured to provide an imaginary component of the antenna impedance corresponding to the quadrature bits, wherein the second circuitry comprises a transistor coupled to the antenna and a capacitor coupled between the antenna and a reference voltage, wherein the transistor includes a gate configured to receive a voltage based on an analog conversion of the quadrature bits, and wherein the backscatter device is configured to provide a backscatter signal including orthogonal frequency division multiplexing (OFDM) packets in accordance with the inphase bits and the quadrature bits.

9. A system comprising:

a helper device configured to transmit a carrier signal; and a backscatter device configured to receive the carrier signal, the backscatter device comprising:

an antenna positioned such that the carrier signal is incident on the antenna;

baseband circuitry configured to provide inphase bits and quadrature bits based on data for transmission, wherein the baseband circuitry includes an analog to digital converter configured to convert the inphase and quadrature bits to converted analog inphase and quadrature bits; and impedance circuitry configured to provide a real component of antenna impedance corresponding to the inphase bits and a complex component of the antenna impedance corresponding to the quadrature bits, such that the backscatter device is configured to backscatter the carrier signal to form a backscatter signal including orthogonal frequency division multiplexing (OFDM) packets, and wherein the impedance circuitry is further configured to receive the converted analog inphase and quadrature bits as input.

10. The system of claim 9, wherein the impedance circuitry comprises a transistor coupled to the antenna, the transistor configured to receive the converted analog inphase bits at a gate of the transistor.

11. The system of claim 10, wherein the impedance circuitry comprises an inductor coupled to the antenna and a varactor coupled between the antenna and a reference voltage, and wherein the inductor is configured to receive the converted analog quadrature bits.

12. The system of claim 10, wherein the transistor comprises a first transistor and wherein the impedance circuitry further comprises a second transistor coupled to the antenna and a capacitor coupled between the second transistor and a reference voltage, and wherein the second transistor is configured to receive the converted quadrature bits at a gate of the second transistor.

13. A system comprising:

a helper device configured to transmit a carrier signal; and a backscatter device comprising:

an antenna positioned such that the carrier signal is incident on the antenna;

baseband circuitry configured to provide inphase bits and quadrature bits based on data for transmission; and impedance circuitry configured to provide a real component of antenna impedance corresponding to the inphase bits and a complex component of the antenna impedance corresponding to the quadrature bits, such that the backscatter device is configured to backscatter the carrier signal to form a backscatter signal including orthogonal frequency division multiplexing (OFDM) packets, wherein the baseband circuitry is configured to provide the inphase and quadrature bits as digital bits to the impedance circuitry.

14. The system of claim 13, wherein the impedance circuitry comprises a first plurality of transistors coupled to the antenna and a plurality of capacitors, each coupled between a respective one of the first plurality of transistors and a reference voltage, the first plurality of transistors configured to receive the quadrature bits at respective gates of the first plurality of transistors and couple selected ones of the plurality of capacitors to the antenna based on the quadrature bits.

15. The system of claim 14, wherein the impedance circuitry comprises a second plurality of transistors coupled to the antenna and a plurality of resistors, each coupled between a respective one of the second plurality of transistors and the reference voltage, the second plurality of transistors configured to receive the inphase bits at respective gates of the second plurality of transistors and couple selected ones of the plurality of resistors to the antenna based on the inphase bits.

16. The system of claim 14, wherein the impedance circuitry comprises a second plurality of transistors coupled to the antenna, each coupled between the antenna and the reference voltage, the second plurality of transistors configured to receive the inphase bits at respective gates of the second plurality of transistors and provide an amount of resistance using the second plurality of transistors based on the inphase bits.

17. A method comprising:

generating data for transmission at a backscatter device;

performing baseband operations on the data to generate inphase and quadrature bits corresponding to the data; and modulating an impedance of an antenna to backscatter an incident carrier signal in accordance with the inphase and quadrature bits to provide a backscattered signal including OFDM packets corresponding to the data, wherein said modulating the impedance comprises coupling an amount of resistance to the antenna based on the inphase bits.

18. The method of claim 17 wherein said generating data comprises sensing data from an environment proximate the backscatter device.

19. The method of claim 17 further comprising converting the inphase and quadrature bits to converted analog inphase and quadrature bits, and wherein said modulating comprises modulating the impedance in accordance with the converted analog inphase and quadrature bits.

20. A method of comprising:
- generating data for transmission at a backscatter device;
- performing baseband operations on the data to generate inphase and quadrature bits corresponding to the data; and
- modulating an impedance of an antenna to backscatter an incident carrier signal in accordance with the inphase and quadrature bits to provide a backscattered signal including OFDM packets corresponding to the data, wherein said modulating the impedance comprises coupling an amount of capacitance to the antenna based on the quadrature bits.

\* \* \* \* \*